(12) United States Patent
Tenmyo

(10) Patent No.: US 6,807,369 B1
(45) Date of Patent: Oct. 19, 2004

(54) ILLUMINATION DEVICE AND PHOTOGRAPHING APPARATUS HAVING THE SAME

(75) Inventor: Yoshiharu Tenmyo, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/549,235

(22) Filed: Apr. 13, 2000

(30) Foreign Application Priority Data

Apr. 15, 1999 (JP) .............................. 11-107755

(51) Int. Cl.$^7$ .............................. G03B 15/03; F21V 5/00
(52) U.S. Cl. ........................ 396/175; 362/18; 362/309; 362/327; 362/277
(58) Field of Search ........................... 396/61, 62, 175; 362/16–18, 277, 308, 327, 328, 309

(56) References Cited

U.S. PATENT DOCUMENTS

| | | | |
|---|---|---|---|
| 5,727,235 A | * | 3/1998 | Ishikawa et al. .............. 396/62 |
| 5,813,743 A | | 9/1998 | Naka ........................... 362/16 |
| 5,926,658 A | | 7/1999 | Tenmyo ....................... 396/177 |
| 6,078,752 A | | 6/2000 | Tenmyo ....................... 396/176 |
| 6,400,905 B1 | * | 6/2002 | Tenmyo ....................... 396/175 |
| 6,575,582 B2 | * | 6/2003 | Tenmyo ........................ 362/16 |
| 6,632,004 B2 | * | 10/2003 | Sugawara et al. .......... 362/281 |
| 2001/0028559 A1 | * | 10/2001 | Tenmyo ....................... 362/16 |

FOREIGN PATENT DOCUMENTS

| | | | | |
|---|---|---|---|---|
| JP | 4-138439 | 5/1992 | .......... | G03B/15/05 |
| JP | 8-262538 | 10/1996 | .......... | G03B/15/05 |

* cited by examiner

*Primary Examiner*—W. B. Perkey
(74) *Attorney, Agent, or Firm*—Fitzpatrick, Cella, Harper & Scinto

(57) ABSTRACT

An illumination device includes a flash discharge tube, an optical prism having a total-reflection surface for totally reflecting at least a part of incident light, light emitted from the flash discharge tube being made incident on the optical prism, and an optical panel, light having exited from the optical prism being made incident on the optical panel, wherein the illumination device varies a state of illumination light by varying a positional relationship between the optical prism and the optical panel.

19 Claims, 19 Drawing Sheets

ILLUMINATION DEVICE AND PHOTOGRAPHING APPARATUS HAVING THE SAME

BACKGROUND OF THE INVENTION

1. Field of the Invention

The present invention relates to an illumination device adapted for a video camera, a film-using camera, a digital camera or the like to be used for photo-taking, and to a photographing apparatus having the illumination device.

2. Description of Related Art

An illumination device used with a photographing apparatus such as a camera or the like for illuminating an object of shooting is composed of a light source (a flash discharge tube) and optical members such as a reflection mirror for guiding a light flux emitted from the light source toward the object, a Fresnel lens, etc.

In respect of such an illumination device, various contrivances have heretofore been made for efficiently collecting a light flux emitted from the light source in the various directions within a necessary angle range of illumination.

Particularly, various illumination devices have recently come to be arranged to enhance light-collecting efficiency and to permit reduction in size by using the total reflection of a prism light guide instead of using the Fresnel lens which has conventionally been disposed in front of the light source.

Meanwhile, illumination devices of the kind having a fixed illumination range have come to present a problem in that a large loss of energy is caused by the inclusion of an unnecessary illumination range in the event of photo-taking at a telephoto position for a narrow illumination range, because the photographing apparatuses have come to be popularly arranged to have a high rate of magnification for zooming. To solve this problem, various illumination devices have been developed to have a variable illumination angle which can be varied according to the range of photo-taking.

For example, an illumination device disclosed in Japanese Laid-Open Patent Application No. HEI 4-138439 is arranged to vary the illumination range. In this case, a total-reflection surface is switched between a reflecting state and a transmitting state from one over to the other by varying the relative positions of an optical prism and a light source.

In another illumination device disclosed in Japanese Laid-Open Patent Application No. HEI 8-262538, an optical prism is divided into upper and lower prisms. The illumination range is changed from one range over to another by rotating the upper and lower optical prisms.

Reduction in weight and size of photographing apparatuses such as cameras have recently furthered. The photo-taking lenses of these apparatuses are meanwhile trending to have a higher rate of zoom magnification. Generally, the reduction in size of the photographing apparatus and the increase in the rate of zoom magnification tend to cause the photo-taking lens to become darker, i.e., to have a larger F-number. Photo-taking with such a dark photo-taking lens without using any auxiliary light source tends to result in a failure, i.e., a blurred picture, caused by image shakes as a shutter speed is set to a slow speed under an automatic exposure control.

To solve this problem, a photographing apparatus, such as a camera, is generally provided with a built-in illumination device (hereinafter referred to as a flash device) which is to be used as an auxiliary light source. In the above-stated background situation, the frequency of use of an auxiliary illumination device is trending to increase to a great degree as compared with the past situation. In addition to that, an amount of light emission per shot is also trending to increase.

Such being the background situation, the illumination device disclosed in Japanese Laid-Open Patent Application No. HEI 4-138439 is arranged to include a light-collecting optical system wherein upper and lower two surfaces are arranged in front of a flash device to cause light fluxes emitted mainly sideway from the light source to enter an optical member and then to be collected in a predetermined direction by total reflection, a surface is arranged in front of the light source to have a positive refractive power so as to collect light, and, after light fluxes are collected respectively by these surfaces, the light fluxes are allowed to exit from one and the same exit surface toward the object of shooting. The range of illumination by the illumination device is arranged to be variable with the reflecting and transmitting actions of a total-reflection surface switched from one over to the other by varying the relative positions of an optical prism and the light source in the light-collecting optical system.

However, in order to accurately vary the angle of illumination according to the above-mentioned method, the surface shape for switching between the total reflection and the transmission is restricted too much for sufficiently allowing latitude in designing the shape of the optical prism. A light quantity loss takes place in a transmitted component at the time of entrance and exit. Further, the size of an effective light-emitting part of the light source greatly contributes to the distribution of luminous intensity. These factors make design work difficult.

The illumination device disclosed in Japanese Laid-Open Patent Application No. HEI 8-262538 is arranged to divide an optical prism into upper and lower prisms and to change the illumination range from one range over to another by rotating the upper and lower optical prisms. According to such an arrangement, however, it is basically only the illuminating direction of the totally-reflected light component that is shifted on the whole, while the luminance intensity distribution characteristic of the illumination device is left unvaried. It is, therefore, hardly possible to obtain a uniform luminance intensity distribution at each of various zoom points.

In the above-stated case, a maximum light-collecting state is obtained when the three areas including the upper, lower and middle areas are overlapped. Then, the range of illumination is expanded by gradually shifting the upper and lower luminance intensity distributions outward by causing the optical prism to rotate. However, while the shift is in process, some in continuous points arise at the overlapping parts among the upper, middle and lower luminance intensity distributions to prevent a uniform distribution within the whole illumination range. The above-mentioned arrangement thus sometimes gives a partly uneven illuminance.

Further, the above-stated illumination device has necessitated use of three optical prism members including the upper, middle and lower prism members and also some parts to be arranged for moving two optical prisms in synchronism with each other. The arrangement of mechanical parts, therefore, tends to become complex.

BRIEF SUMMARY OF THE INVENTION

It is an object of the invention to provide an illumination device, or a photographing apparatus having the illumination device, wherein an illumination optical system is formed in a configuration which is more compact as a whole than the conventional illumination optical system and yet is arranged to be capable of varying the angle of illumination.

It is another object of the invention to provide an illumination device, or a photographing apparatus having the illumination device, arranged to have a uniform luminous intensity distribution characteristic at every zoom point and to minimize the amount of movement required for varying the angle of illumination.

It is a further object of the invention to provide an illumination device arranged to be extremely small and thin in size and light in weight and to have a variable illumination angle.

It is a still further object of the invention to provide an illumination device, or a photographing apparatus having the illumination device, arranged to be capable of utilizing energy obtained from a light source at a high rate of efficiency, obtaining a uniform luminous intensity distribution characteristic at every zoom point and to be highly suited for a still camera, a video camera, a digital camera or the like.

To attain the above objects, in accordance with an aspect of the invention, there is provided an illumination device, comprising a light source, a first optical member having a total-reflection surface for totally reflecting at least a part of incident light, light emitted from the light source being made incident on the first optical member, and a second optical member, light having exited from the first optical member being made incident on the second optical member, wherein the illumination device varies a state of illumination light by varying a positional relationship between the first optical member and the second optical member.

Further, in accordance with another aspect of the invention, there is provided a photographing apparatus, comprising a photographic optical system, and the above illumination device, wherein the photographing apparatus varies a state of illumination light emitted from the illumination device, according to a state of the photographic optical system.

The above and other objects and features of the invention will become apparent from the following detailed description of preferred embodiments thereof taken in connection with the accompanying drawings.

DETAILED DESCRIPTION OF THE INVENTION

Hereinafter, preferred embodiments of the invention will be described in detail with reference to the drawings.

Figure 1:
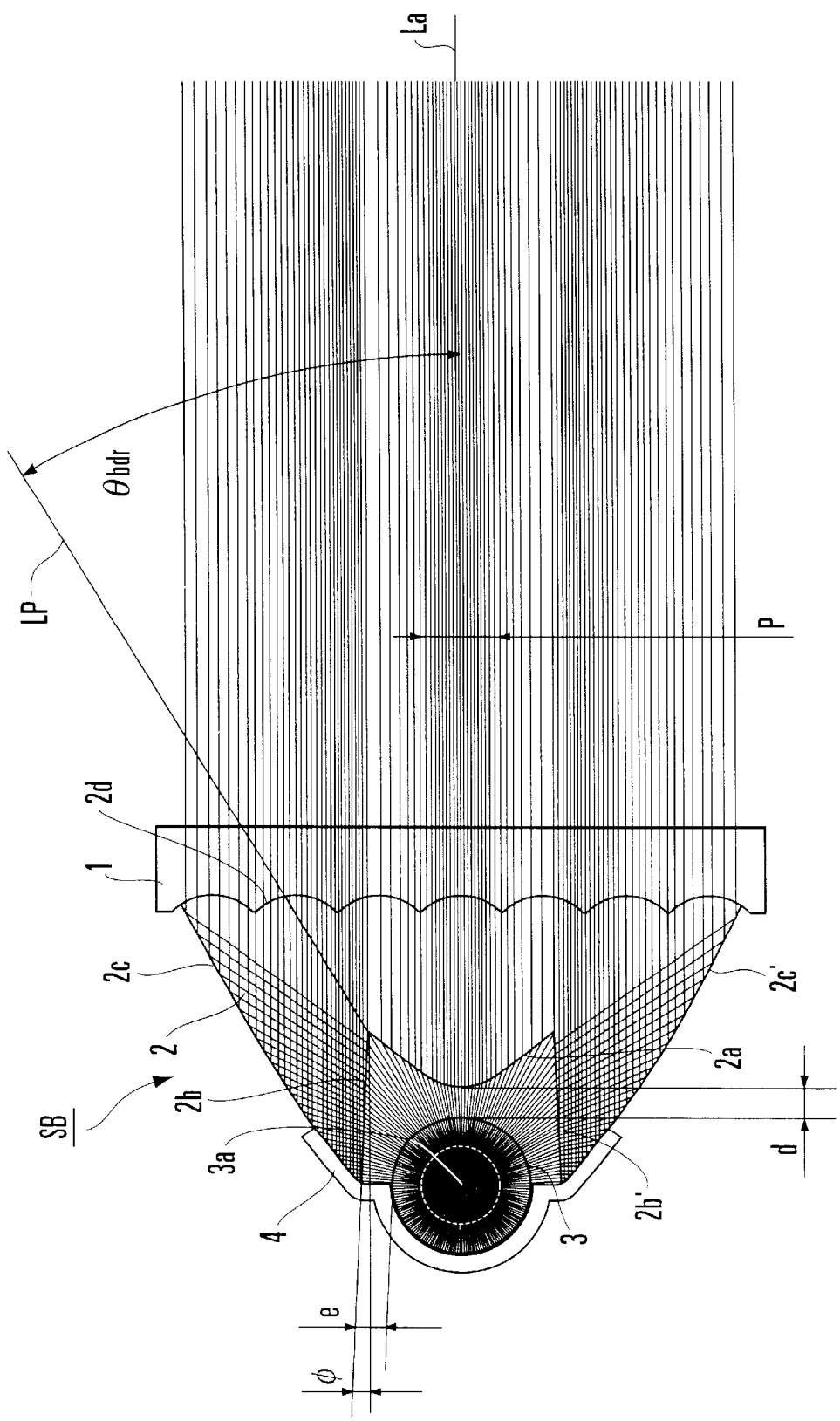
FIG. 1 is a vertical sectional view taken in the direction of diameter of a flash discharge tube of a flash (illumination) device, showing a distribution of rays of light in a light-collecting state according to a first embodiment of the invention.
Figure 2:
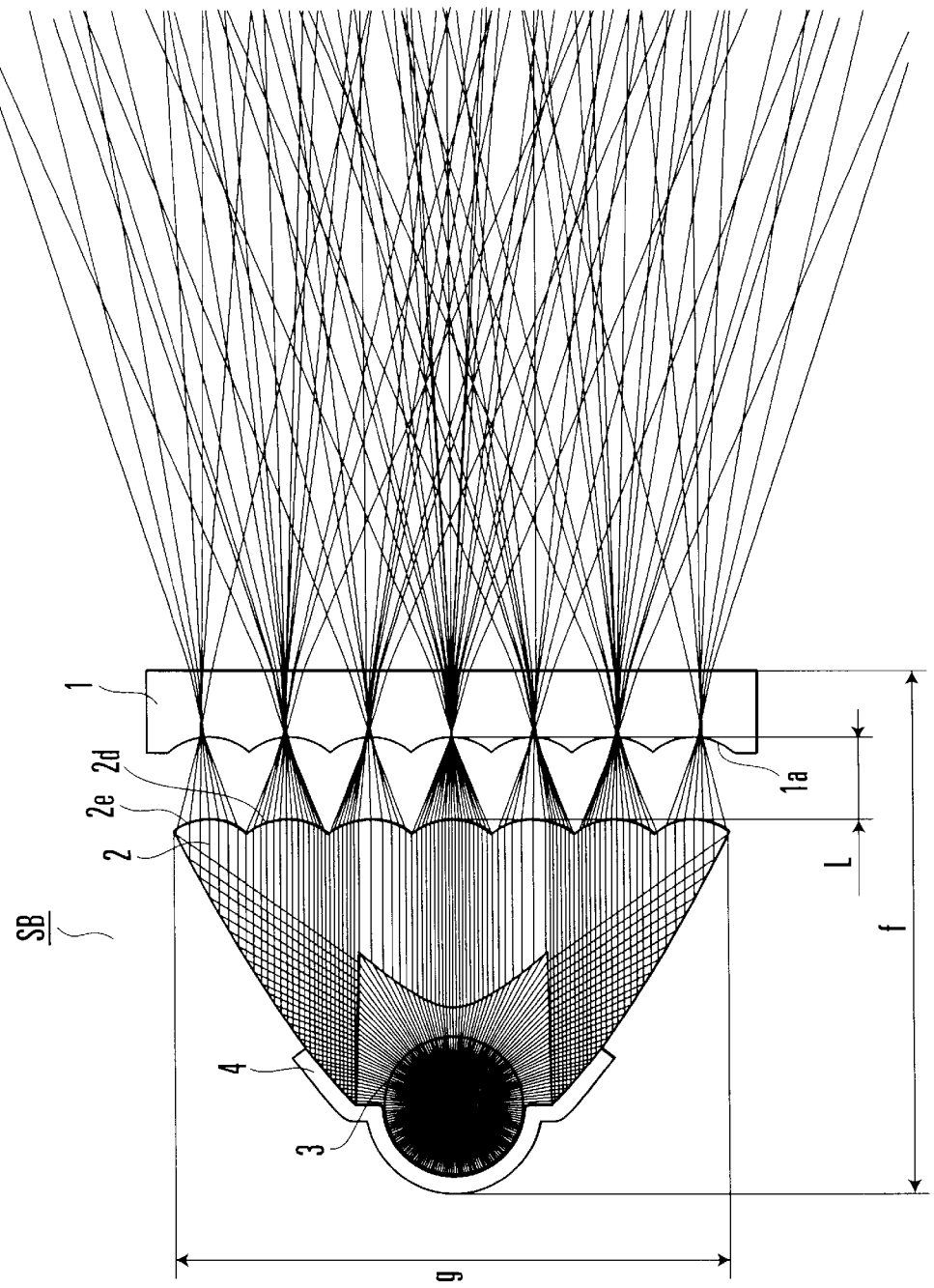
FIG. 2 is a vertical sectional view taken in the direction of diameter of the flash discharge tube of the flash device according to the first embodiment showing a distribution of rays of light in a light-diffusing state.
Figure 3:
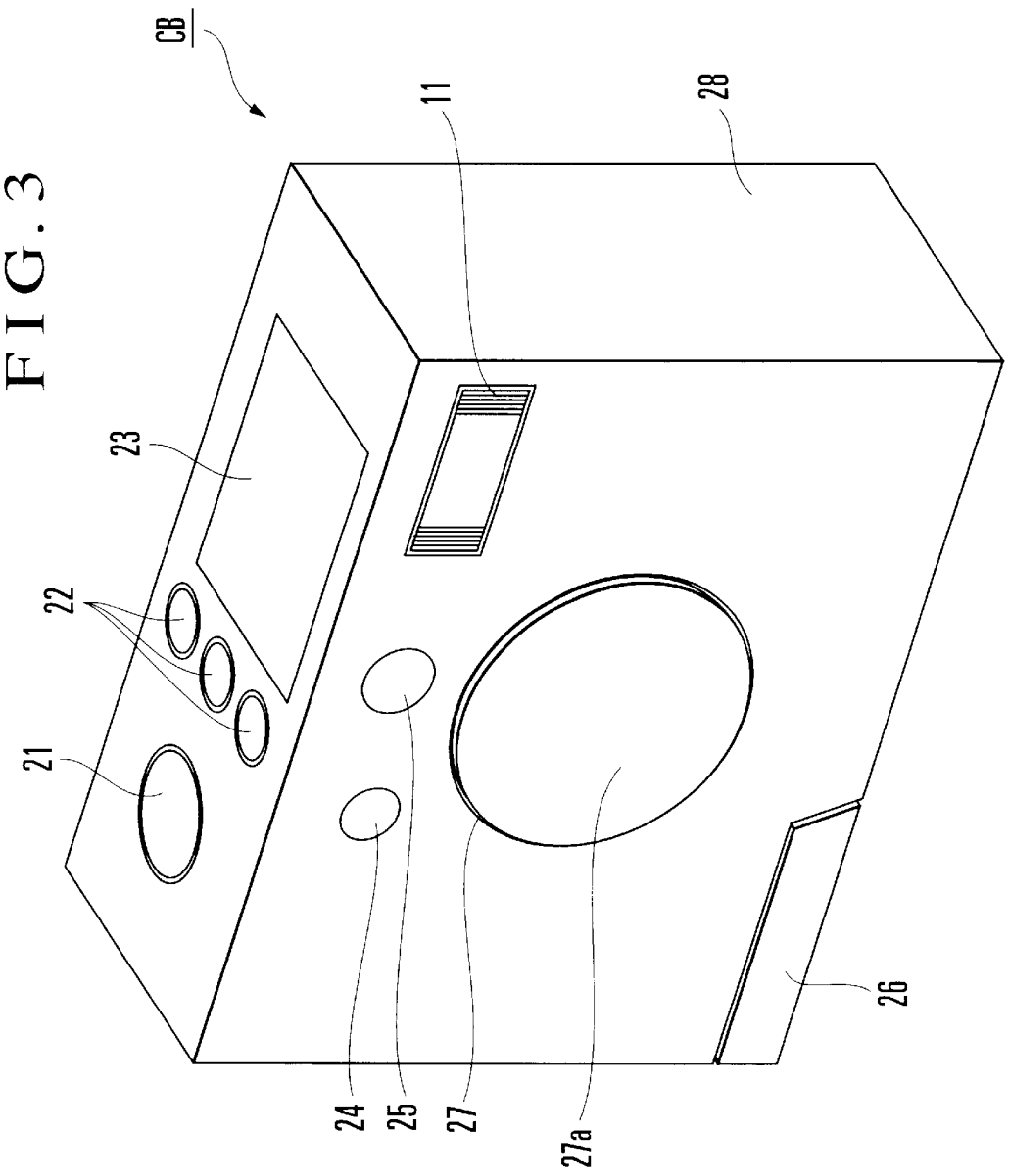
FIG. 3 is a perspective view showing a camera using the flash device according to the first embodiment.
Figure 4:
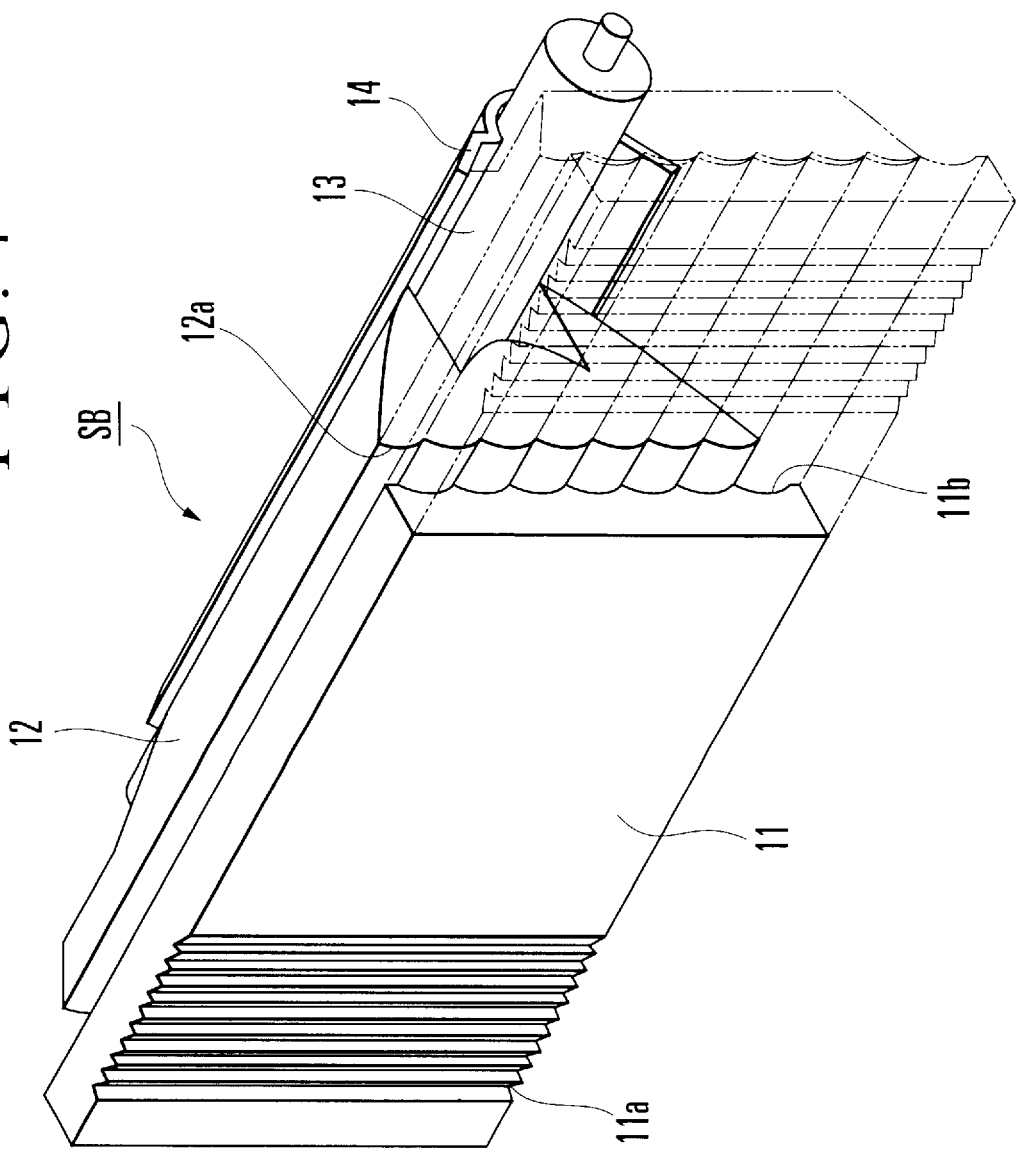
FIG. 4 is a partly-sectional perspective view showing essential parts of an optical system of the flash device according to the first embodiment as viewed from the front side of the flash device.

FIGS. 1 to 4 show, in outline, essential parts of a flash device, i.e., an illumination device, according to a first embodiment of the invention. Of these figures, FIGS. 1 and 2 are vertical sectional views showing essential parts of an optical system of the flash device SB. FIG. 3 is a perspective view showing a camera CB, i.e., a photographing apparatus, using the flash device (illumination device) according to the first embodiment of the invention. FIG. 4 is a perspective view showing the optical system of the flash device SB as viewed from the front side thereof. In FIG. 4, for showing the internal arrangement, the illumination device is shown in part in the form of a sectional view. Further, the illustration of each of FIGS. 1 and 2 includes traces of rays of light exiting from the center 3a of a light source 3.

In FIG. 3, reference symbol CB denotes the camera, which includes an optical panel 11 of the flash device (illumination device), a release button 21, a group of operation switches 22 for selection of various modes of the camera, a liquid crystal display window 23 for allowing the user of the camera to know the actions of the camera, a peep window 24 of a light measuring device for measuring the brightness or luminance of external light, a peep window 25 of a viewfinder, a cartridge loading chamber cover 26 for loading the camera with a cartridge-type film, a lens barrel 27 having a photo-taking lens 27a, and a camera body 28. With the exception of the flash (light emitting) device, all of these parts are arranged respectively in known manners and, therefore, the details of them are omitted from the following description. Further, with respect to the illumination device (flash device), the invention is not limited to the use of the mechanical components mentioned above.

Referring to FIG. 4, the optical panel 11 has its aperture part exposed at a part of the external surface of the camera and, as shown in FIG. 4, the outside surface of the optical panel 11 has vertical Fresnel lens parts 11a formed at peripheral parts and a flat surface formed at a middle part. On the back (inner) side of the optical panel 11, there are formed cylindrical lenses 11b in a plurality of rows each having a negative refractive power in a direction which is approximately perpendicular to the direction of the refractive power of the Fresnel lenses 11a.

Referring further to FIG. 4, an optical prism 12 is arranged to control a luminous intensity distribution characteristic mainly in the vertical direction. A light-exiting part of the optical prism 12 has cylindrical lenses 12a arranged in a plurality of rows each having a positive refractive power. The optical panel 11 and the optical prism 12 are made of an optical resin material of a high transmission factor, such as an acrylic resin or the like. A linear flash discharge tube 13 (xenon tube) is arranged to emit flash light therefrom. A reflector 14 is arranged to reflect a light flux component emitted rearward from the flash discharge tube 13 to a light-exiting direction. The inner surface of the reflector 14 is formed with a material of a high reflection factor such as a bright aluminum or the like.

In a case where the camera CB, i.e., a photographing apparatus, is set, for example, in an "automatic flash mode" in a known manner, a central processing unit (CPU) (not shown) disposed within the camera CB decides whether or not the flash device SB is to be allowed to emit light or not according to the luminance of the external light measured by the light measuring device and the sensitivity of the film in use, once the release button 21 is depressed by the user.

If the CPU decides to use the flash device under the current photo-taking conditions, a light emission signal is issued to cause, through a trigger lead wire attached to the reflector 14, the flash discharge tube 13 to emit light. Light fluxes emitted from the flash discharge tube 13 and exiting in a direction opposite to the direction of an illumination light axis are reflected by the reflector 14 and then pass through the optical prism 12 and the optical panel 11 disposed on the front side of the camera, and light fluxes emitted from the flash discharge tube 13 and exiting in the direction of the illumination light axis directly pass through the optical prism 12 and the optical panel 11. These light fluxes are converted into a light flux of a desired luminous intensity distribution characteristic. The light flux thus converted then comes to illuminate the object of shooting.

A luminous intensity distribution characteristic in the vertical direction with respect to the object is approximately determined by the optical prism 12 and the surface 11b on the light source side of the optical panel 11, and a luminous intensity distribution characteristic in the horizontal direction is controlled and changed into a desired distribution characteristic by the Fresnel lens 11a formed on the object side of the optical panel 11.

According to the invention, in a case where the photo-taking lens 27a of the photographing apparatus CB is a zoom lens, the positional relationship between the optical panel 11 and the optical prism 12 is varied in accordance with the focal length of the zoom lens which varies with the variation of magnification. The luminous intensity distribution characteristic in the vertical direction of the flash device is thus arranged to correspond to the photo-taking lens 27. The details of a method for setting the luminous intensity distribution characteristic in the vertical direction are described below with reference to FIGS. 1 and 2.

FIGS. 1 and 2 are vertical sectional views taken in the direction of diameter of the flash discharge tube 13 of the flash device SB. Referring to FIGS. 1 and 2, an optical panel 1 is arranged as a second optical member to be used for control over the distribution of luminous intensity. An optical prism 2 is arranged as a first optical member to be used mainly for control over the luminous intensity distribution in the vertical direction. A flash discharge tube 3 is in a cylindrical shape. A reflector 4 is arranged in a half cylindrical shape which is concentric with the flash discharge tube 3. The confronting surfaces of the optical panel 1 and the optical prism 2 are in such shapes as to approximately fit in with each other. FIG. 1 shows the two optical members 1 and 2 in a state of being nearest to each other. FIG. 2 shows the two optical members 1 and 2 in a state of being at a predetermined distance from each other. FIGS. 1 and 2 also show the traces of representative rays of light emitted from the center part of inside diameter of the flash discharge tube 3. Further, in FIGS. 1 and 2, the arrangement and shape of the optical systems are the same, with the exception of the positional relationship between the optical panel 1 and the optical prism 2 and rays of light.

The first embodiment is arranged to be capable of continuously varying an illumination range while keeping the luminous intensity distribution characteristic in the vertical direction uniform and also to minimize the vertical dimension of the aperture part. The following describes in detail the configuration, the behavior of rays of light, etc., in the first embodiment.

FIG. 1 shows the inside and outside diameters of the glass tube of the flash discharge tube 3. To enhance its light emission efficiency, the flash discharge tube of a flash device SB of this kind is actually arranged, in most cases, to emit light to the full range of its inside diameter. Therefore, the flash discharge tube 3 can be considered to be approximately uniformly emitting light over the full range of inside diameter. However, in designing the optical system, for efficient control over the light emitted from the light source, a point source of light is assumed to be ideally at the center of the light source, instead of simultaneously considering all the rays of light from the whole inside diameter. After that, the result of designing is corrected by taking the limited size of the light source into consideration.

In the case of the invention, on the basis of the above-stated concept, the center of a light emitting part 3a of the light source 3 is considered to be a datum or reference point of determining the configuration of the optical system. The configuration of each part of the optical prism 2 is set in the following manner.

First, with respect to the material for the optical panel 1 and the optical prism 2, use of an optical resin material such as an acrylic resin or the like is suitable in terms of moldability, cost and optical properties. However, in addition to such properties, it is necessary to consider that a great amount of heat is generated concurrently with generation of light from the light source 3 in the case of the illumination device of this kind.

The optical material must be selected and heat dissipating spaces must be set by considering the amount of heat generation per light emission and the shortest light emission period.

The parts that are most vulnerable to heat are entrance surfaces 2a and 2b of the optical prism 2 which are located nearest to the light source 3. Minimum distances from the light source 3 to the entrance surfaces 2a and 2b must be first decided. In the first embodiment, a minimum distance from the light source 3 to the first entrance surface 2a which controls light by directly refracting an angular component having an exit angle θbdr from the light source center 3a near to an exit optical axis La is set at "d", and a minimum distance from the light source 3 to the second entrance surface 2b which controls light by totally reflecting an angular component located away from the exit optical axis La is set at "e". The distances from the light source 3 are restricted in this manner.

The practical numerical values of the first embodiment are as follows.

The outside diameter of the flash discharge tube 3 is 2.0 mm, and the inside diameter thereof is 1.3 mm. The minimum distance "d" is 0.5 mm, and the minimum distance "e" is 0.55 mm.

The configurations of the second entrance surfaces 2b and 2b' which are arranged to guide the incident light to the total-reflection surfaces 2c and 2c' of the optical prism 2 are next decided. In order to minimize the shape of the optical prism 2, these entrance surfaces 2b and 2b' are preferably plane surfaces extending in parallel with the optical axis, because of the following reason.

In the light flux emitted and exiting from the light source 3, a component light flux emitted in a direction differing from the exit optical axis La is refracted once at the entrance surface. However, the smaller the angle of inclination of the entrance surface, the greater the refracting effect. Therefore, a smaller angle of inclination of the second entrance surfaces leads the incident light once in the directions of parting more away from the optical axis, so that the total length of the optical prism 2 can be minimized.

The inclination of the second entrance surfaces 2b and 2b' is determined by the molding conditions of the optical prism 2. The smaller angle of inclination makes the molding conditions more strict and severe. However, the maximum angle value φ of these surfaces 2b and 2b' with respect to the optical axis is preferably set within the following range, irrespective as to whether the entrance surfaces 2b and 2b' are flat or curved:

$$0 \leq \phi < 2° \quad (1)$$

The range shown above appears to be difficult to set. However, since the second entrance surfaces 2b and 2b' are at short distances and are flat and smooth, this numerical value range is sufficiently practicable.

With the inclination of the second entrance surfaces 2b and 2b' restricted in this manner, the vertical dimension of the aperture can be minimized without incurring any decrease in efficiency.

A method for deciding the configuration of the first entrance surface 2a is next described. In order to make the luminous intensity distribution characteristic variable to a great extent with a smallest possible size, the configuration of the first entrance surface 2a is restricted and decided in the following manner.

In the light flux emitted from the center 3a of the light source 3, all components of the light flux that are directly incident on the entrance surface 2a are converted to be in parallel with the exit optical axis as shown in a sectional view in FIG. 1. The entrance surface 2a has a focal length which is a distance from the light source center 3a, determined by taking into consideration the glass thickness of the flash discharge tube 3, to the entrance surface 2a and is composed of cylindrical surfaces formed thereon. In other words, the focus of the entrance surface 2a coincides with the light source center 3a.

Further, in the case of the first embodiment, to minimize the size of the optical system, the configurations of the second entrance surfaces 2b and 2b' and those of total-reflection surfaces 2c and 2c' are determined as follows.

Light flux components which are incident on the entrance surfaces 2b and 2b' in the light flux emitted from the center 3a of the light source 3 are converted, after being reflected by the total-reflection surfaces 2c and 2c', to be in parallel with the exit optical axis, as viewed in FIG. 1.

Light flux components emitted rearward on the exit optical axis in the light flux emitted from the flash discharge tube 3 is reflected by the reflector 4, because the shape of the reflector 4 is concentric with the flash discharge tube 3. After that, the light flux components fall again on the flash discharge tube 3 and are then led forward along the exit optical axis approximately through the center of the flash discharge tube 3, i.e., the light source 3. These rays of light behave in the same manner as described above after they come back to the center 3a of the light source 3.

As described above, the light flux emitted from the center 3a of the light source 3 is refracted by the entrance surface 2a, or is reflected by the total-reflection surfaces 2c and 2c' after being refracted at the entrance surfaces 2b and 2b'. After that, all these light flux components are converted into components which are in parallel with the exit optical axis to be led to an exit surface 2d, as shown in the sectional view of FIG. 1.

The depth of the optical prism 2 is arranged to extend to such a length by which the light flux components nearest to the direct entrance surface 2a among the light components incident on the second entrance surfaces 2b and 2b' can be totally reflected. This arrangement prevents any of the components incident on the second entrance surfaces 2b and 2b' from directly coming to the exit surface 2d to enhance efficiency, so that control can be adequately accomplished with the illumination device arranged in a minimum size.

In a case where the inside diameter of the light source 3 is sufficiently small or where the optical prism 2 can be considered to be sufficiently large relative to the light source 3, light-collecting control can be efficiently accomplished by the above-stated method. However, in respect of an actual luminous intensity distribution characteristic, the actual size of inside diameter of the light source representing an effective light emitting part thereof is not ignorably small. Therefore, the light flux components passing through the optical prism 2 are not completely converted to be in parallel with the exit optical axis but is converted into a distributed state of spreading within a certain range in the vertical direction.

Particularly, the adverse effect of the size of the inside diameter is salient on a reflection light flux reflected by the entrance surface 2a which directly controls the light flux emitted from the light source and also on reflection light flux components reflected by rear end parts of the total-reflection surfaces 2c and 2c' of the optical prism 2 located near to the light source. In actuality, therefore, it is inevitable that the luminous intensity distribution of the light flux components controlled within this range comes to spread to a certain extent.

Next, the position of the boundary surface of the entrance surface 2a is described as follows. As mentioned above, in order to form an efficient and minimal-sized optical system while taking into consideration the adverse effect of heat on the resin material of the entrance surface 2a, it is desirable that the angle θbdr of a straight line LP connecting the center 3a of the light source 3 to the coordinates of a point where the first entrance surface 2a intersects the second entrance surface 2b or 2b' is within a predetermined range.

If this angle θdbr is less than a predetermined angle, a distance to the first entrance surface 2a increases to enhance the light-collecting efficiency because it becomes less vulnerable to the adverse effect of the size of the light source 3. However, the angle of incidence on the second entrance surfaces 2b and 2b' becomes larger. The larger incident angle more likely results in a loss due to the surface reflection at the entrance surfaces 2b and 2b'.

On the other hand, if the angle θdbr is larger than the predetermined angle, the amount of incident light flux components from the first entrance surface 2a requiring control on a plane near to the light source 3 increases.

Therefore, depending on the size of the light source 3, it might become difficult to attain a sufficient light-collecting effect.

Therefore, it is preferable to have the angle θbdr of the straight line LP within a range of numerical values described below.

With the inclination of a line segment connecting the center of the light source 3 to a boundary line between the entrance surface 2a which controls solely by refraction the light coming to the front of the optical prism 2 and the entrance surface 2b or 2b' which guides the light coming mainly from the light source 3 obliquely frontward assumed to be θbdr, it is preferable, in terms of efficiency and light-collecting control, that the inclination θbdr is within a range expressed as follows:

$$25° \leq \theta bdr \leq 45° \quad (2)$$

Next, the configuration of a point of intersection between the entrance surface 2b or 2b' and the total-reflection surface 2c or 2c' is described.

The first embodiment is arranged to have this point formed at an acute angle by direct intersection and to have that position of this intersection point nearly coincide with the position of the light source center 3a in the horizontal direction (in the direction of an optical axis).

The arrangement described above effectively permits the optical prism 2 to be formed in a minimal size and yet to be capable of efficiently controlling the luminous intensity distribution. For example, if a surface having a different characteristic, such as a surface perpendicular to the optical axis, is interposed in between the entrance surface 2b or 2b' and the total-reflection surface 2c or 2c', this surface does not function as an optical member and causes an increase in size in the vertical direction, or in the direction of depth. Such a configuration is, therefore, hardly desirable in respect of reduction in size.

The first embodiment is arranged to have the position of the above-stated intersection point coincide with that of the center 3a of the light source 3 in the horizontal direction. This arrangement is necessary for minimization of the size of the whole optical system without lowering efficiency and is closely related to the angle of total reflection within the prism and also to the configuration of the reflector decided according to the light source.

More specifically, in respect of the total reflection within the optical prism 2, with the angle of inclination of the entrance surfaces 2b and 2b' set in the neighborhood of zero degree and the optical prism 2 assumed to be made of a resin material which has its refractive index at 1.5 or thereabout, if the intersection point of the prism surfaces is shifted rearward, the total reflection cannot be completely made, causing some light components to exit rearward. This more likely takes place accordingly as the inside diameter of the light source 3 increases. Then, a portion of the light flux component emitted forward from the light source center 3a comes to slip off from the total-reflection surface 2c or 2c' of the optical prism 2.

In the first embodiment, a reflection surface formed on the extension line of the reflector 4 is arranged to cause the light slipped off rearward from the total-reflection surface 2c or 2c' to be reflected back into the optical prism 2 again. However, a loss in the quantity of light tends to take place due to absorption by the reflector 4 and some surface reflection made at the time of exit and reentrance.

In view of the problem, the first embodiment is arranged to extend the reflector 4 to a maximum extent at which it still effectively functions and to have light come to the surface of the optical prism 2 after the reflector 4. The reflector 4 is formed in a half-cylindrical shape which is concentric with the flash discharge tube 3, i.e., the light source. The fore end of the aperture part of the reflector 4 is made to approximately coincide with the position in the horizontal direction of the light source center 3a.

Further, the rear end of the optical prism 2 is also arranged to coincide with the position in the horizontal direction of the light source center 3a, thereby having no gap against the reflector 4.

The reflector 4 is thus arranged to have its configuration concentric with the light source center 3a and its fore end coincide with the light source center 3a for various reasons, including first the influence of the glass part of the flash discharge tube 3.

In a case where a light emitting optical system is extremely small as in the case of the first embodiment, the optical system must be arranged to cause a light flux component emitted rearward from a light source to be reflected by a reflector to change its direction to the illuminating direction. However, since the whole optical system is compact, a space available is limited and it is hard to control all rays of reflection light from the reflector by allowing them to go round outside of the flash discharge tube 3 without having them pass through the inside of the flash discharge tube 3. Therefore, an optical path must be arranged to allow the reflection light to reenter the inside of the glass tube of the flash discharge tube 3.

At this time, the light component having reentered the flash discharge tube 3 is subjected to the adverse effects of the refraction and total reflection of the glass part of the flash discharge tube 3. Then, the light incident on the optical prism 2 which is disposed in front of the flash discharge tube 3 is also greatly affected by these adverse effects. If the glass part of the flash discharge tube 3 is thick, the adverse effects become salient. Therefore, if the configuration of the reflector fails to appositely correlate with that of the light source (flash discharge tube 3), the distribution of the reflection light from the reflector spreads to an extent more than necessary.

In view of this, in the first embodiment, the reflector 4 is formed in a cylindrical shape which corresponds to the shape of the light source, i.e., the flash discharge tube 3, and is formed to be concentric with the cylindrical glass part of the flash discharge tube 3. By virtue of this, the angle of incidence at the time of reentrance to the flash discharge tube 3 becomes small. The small angle of incidence lessens a loss caused by the surface reflection of the glass tube part and also lessens the amount of light flux components totally reflected within the glass tube part after reentrance. The light-collecting control efficiency can be enhanced by this arrangement. The arrangement of the first embodiment for minimizing a gap with respect to the light source 3 is particularly advantageous, because it lessens angular variations after reflection by the reflector 4.

The half-cylindrical shape of the reflector 4 is arranged to approximately coincide with the position of the light source center 3a for the following reason. If the reflector 4 is arranged to be extending further, it would come round on its front side to prevent light from exiting from the inside of the reflector 4. Under such a condition, the light-collecting efficiency would become lower.

On the other hand, if the reflector 4 is arranged to be shorter than the position of the light source center 3a, the rear end of the optical prism 2 would extend rearward as mentioned in the foregoing. Such arrangement not only results in a loss of light quantity but also increases the size of the whole optical system.

The reflection surface of the reflector 4 extends to come round almost to the front end of the flash discharge tube 3 which is the light source disposed in rear of the total-reflection surfaces 2c and 2c' of the optical prism 2. The part thus coming round is formed in a shape which is almost the same as the shape of the total-reflection surfaces 2c and 2c'.

The reason for this is as follows. The inside diameter part of the glass tube of the flash discharge tube 3 exists also on the front side of the light source center 3a. The above-stated shape of the reflection surface of the reflector 4 is arranged to prevent any part of a flight flux emitted from this front side from coming to the outside without being completely totally reflected at the total-reflection surface 2c or 2c'. With the reflection surface thus arranged to be in about the same shape as the total-reflection surfaces 2c and 2c' and to be disposed immediately behind the total-reflection surfaces 2c and 2c', the reflector 4 gives about the same effect as the effect of the total-reflection surfaces 2c and 2c' of the optical prism 2, so that the light from the light source can be efficiently and uniformly distributed within a necessary illumination range.

With the configuration of the optical prism 2 decided according to the method described above, it is possible to form a light-collecting optical system, by taking into consideration the exothermic condition of the light source, in a minimum size and yet to have a maximum light-collecting efficiency.

The illumination-angle varying mechanism of the first embodiment is characterized in that, on the basis of the compact light-collecting optical system (1, 2 and 4), a light flux as collected is controlled to be gradually diffused at a predetermined rate in such a way as to coincide with a necessary luminous intensity distribution characteristic.

The conventional arrangement has necessitated to arrange an optical system in a large size in order to attain a maximum light-collecting effect. In accordance with the arrangement of the first embodiment, on the other hand, the optical system can be arranged in an extremely compact size in attaining the maximum light-collecting effect. The arrangement of the first embodiment, therefore, permits to efficiently attain a characteristic necessary for a variable-illumination-angle illumination optical system.

Further, since the amount of movement of optical elements for varying an illumination angle is much smaller than in the conventional method, an illumination optical system can be designed by efficiently utilizing spaces available within a compact photographing apparatus. Therefore, the compact photographing apparatus can be arranged at low cost without necessitating use of many additional parts.

A method for varying the illumination angle most characteristic of the invention is next described below with reference to FIGS. 1 and 2.

FIG. 1 shows a maximum light-collecting state. FIG. 2 shows the area of illumination in a maximum spread state. The exit surface 2d of the optical prism 2 has, as optical means, a plurality of rows of cylindrical lenses 2e (as a patternized surface having refractive power) each of which is formed to have a positive refractive power and a focal length D with spherical aberration corrected and which are arranged at a pitch P each extending in parallel with the axial direction of the flash discharge tube 3 (a direction perpendicular to the surface of FIG. 1).

On the other hand, the surface of the optical panel 1 which is opposed to the optical prism 2 has, as optical means, a plurality of rows of cylindrical lenses 1a (a patternized surface having refractive power) each of which is formed to have a negative refractive power and which are arranged at the same pitch P as that of the plurality of cylindrical lenses 2e of the optical prism 2 in such a way as to fit in with the plurality of cylindrical lenses 2e of the optical prism 2 (cancel the refractive power of the cylindrical lens 2e of the optical prism 2) when the optical prism 2 and the optical panel 1 are put into close contact with each other.

In a state in which the optical prism 2 and the optical panel 1 are nearly in close contact with each other as shown in FIG. 1, the positive refractive power of the cylindrical lenses 2e formed on the exit surface 2d of the optical prism 2 is offset by the negative refractive power of the cylindrical lenses 1a of the optical panel 1. The light collected by the optical prism 2 thus exits from the optical panel 1 with its collected state intact. This state represents the maximum light-collecting effect of the illumination-angle varying action.

The light-diffusing state shown in FIG. 2 is described as follows. The state of FIG. 2 is obtained by moving a whole light emitting unit composed of the optical prism 2, the flash discharge tube 3 and the reflector 4 with respect to the optical panel 1 which is fixed to the external part of the photographing apparatus. With a maximum amount of movement of the light emitting unit assumed to be L in the case of the first embodiment, the light emitting unit is moved up to the maximum amount L which approximately coincides with the focal length D of the cylindrical lenses 2e of the optical prism 2.

As shown in FIG. 2, in comparison with the state of FIG. 1, the light flux after exiting from the optical panel 1 uniformly spreads at a fixed rate. It is readily apparent from FIG. 2 that the light uniformly illuminates a necessary illumination area at a fixed rate of spread, even if the size of the light source is taken into consideration.

Figure 5:
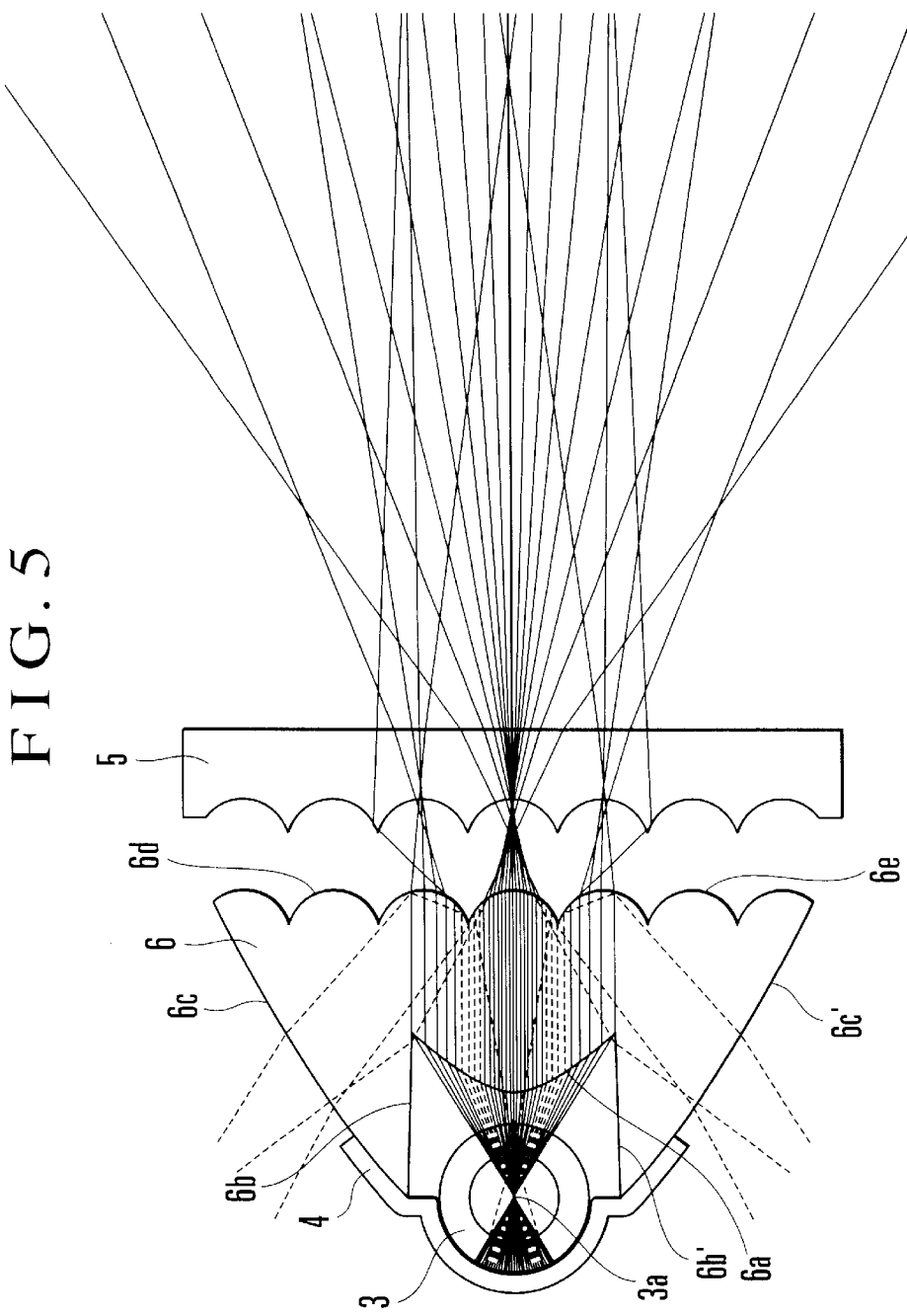
FIG. 5 is a vertical sectional view taken in the direction of diameter of the flash discharge tube of the flash device showing the arrangement of the first embodiment.

The practical configuration of the illumination-angle varying part which is arranged to vary the rate of diffusion mentioned above is next described referring to FIGS. 5 and 6 which show the traces of rays of light. In FIG. 5, in a light flux emitted from the center 3a of the light source 3, only a component thereof incident on a first entrance surface 6a of an optical prism 6 is shown to make the illustration clearly understandable. Other light flux components incident on second entrance surfaces 6b and 6b' of course have about the same characteristic as that of the light flux component shown.

In the case of FIG. 5, the refractive power of cylindrical lenses 6e formed on the exit surface 6d of the optical prism 6 is made stronger than in the case of the first embodiment. To make the illustration more clearly understandable, the spherical aberration of each of cylindrical surfaces is assumed to be not corrected.

Figure 6:
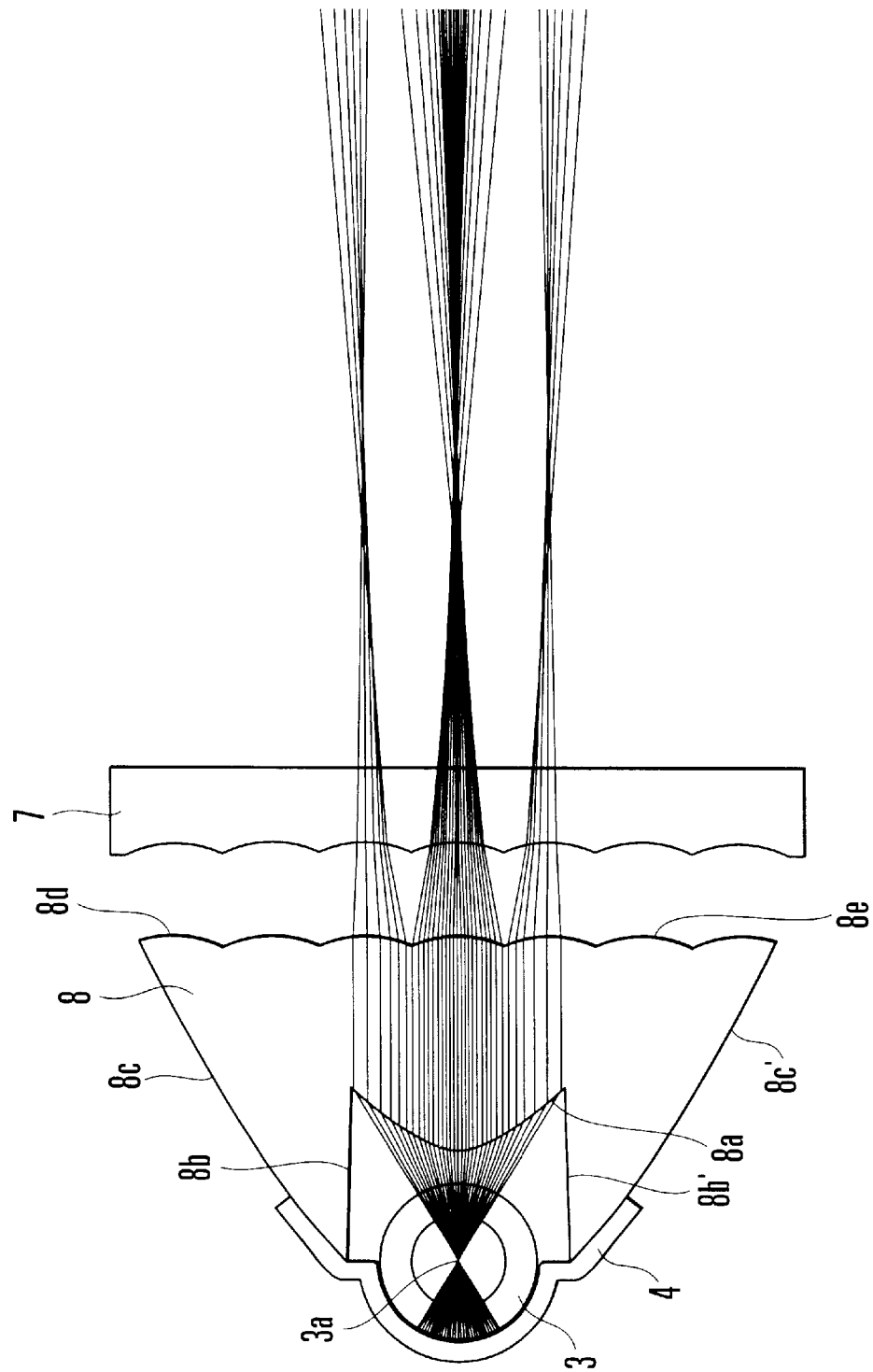
FIG. 6 is a vertical sectional view taken in the direction of diameter of a flash discharge tube of another flash device also showing the arrangement of the first embodiment of the invention.

FIG. 6 shows, on the contrary, a case where the refractive power of cylindrical lenses 8e is weakened. The spherical aberration of the cylindrical surface is left uncorrected also in this case. As apparent also from FIG. 5, if the refractive power of the cylindrical lenses 6e formed on the optical prism 6 is excessively large as in the case of FIG. 5, totally-reflected components arise at the exit surface 6d as shown by broken lines in FIG. 5. The totally-reflected components take optical paths returning to the light source again. There are many such components that do not exit from the exit surface 6d again, thereby lowering the efficiency.

While only the light flux emitted from the light source center 3a is shown in FIG. 5, light is actually emitted from the whole inside diameter part of the flash discharge tube 3. Hence, the excessively strong refractive power causes a larger amount of loss of light quantity.

Meanwhile, in a case where the refractive power of the cylindrical lenses 8e is excessively weak as shown in FIG. 6, no loss component is caused by total reflection. However, the illumination angle does not much vary in this case. Therefore, the object of the invention which is to bring about a large change in illumination with a small amount of movement is hardly attainable with the weak refractive power. In view of this, it is preferable to have the refractive power of the optical prism and that of the optical panel set within a certain suitable range.

The amount of movement of the optical prism and the optical panel for zooming must be decided by taking into consideration not only a mechanical space limitation but also the stopping precision of a driving system, the precision of detecting the amount of movement, a hysteresis in the moving direction and, further, an amount of changes of the luminous intensity distribution resulting from a moving error. In the case of an arrangement according to the invention, a practicable amount of movement can be set within a certain preferable range, which is described as follows.

A method for setting the preferable range is first described for a case where the convex and concave cylindrical surfaces formed on the opposed surfaces of the optical prism 2 and the optical panel 1 which approximately fit in with each other, as in the case of the first embodiment shown in FIG. 1 and 2, with the cylindrical surfaces assumed to be cylindrical lenses for the sake of simplification of description.

In this case, a change of illumination angle is determined approximately by the refractive power of the convex (positive) lenses formed on the optical prism. As mentioned above, imparting a larger refractive power makes the change of illumination angle greater but it increases such light components that fail to exit from the exit surface 2d due to total reflection. If the size of the light source is sufficiently small with respect to the size of the whole optical system, to begin with, the light flux from the light source center is converted to be in parallel with the exit optical axis.

Figure 10:
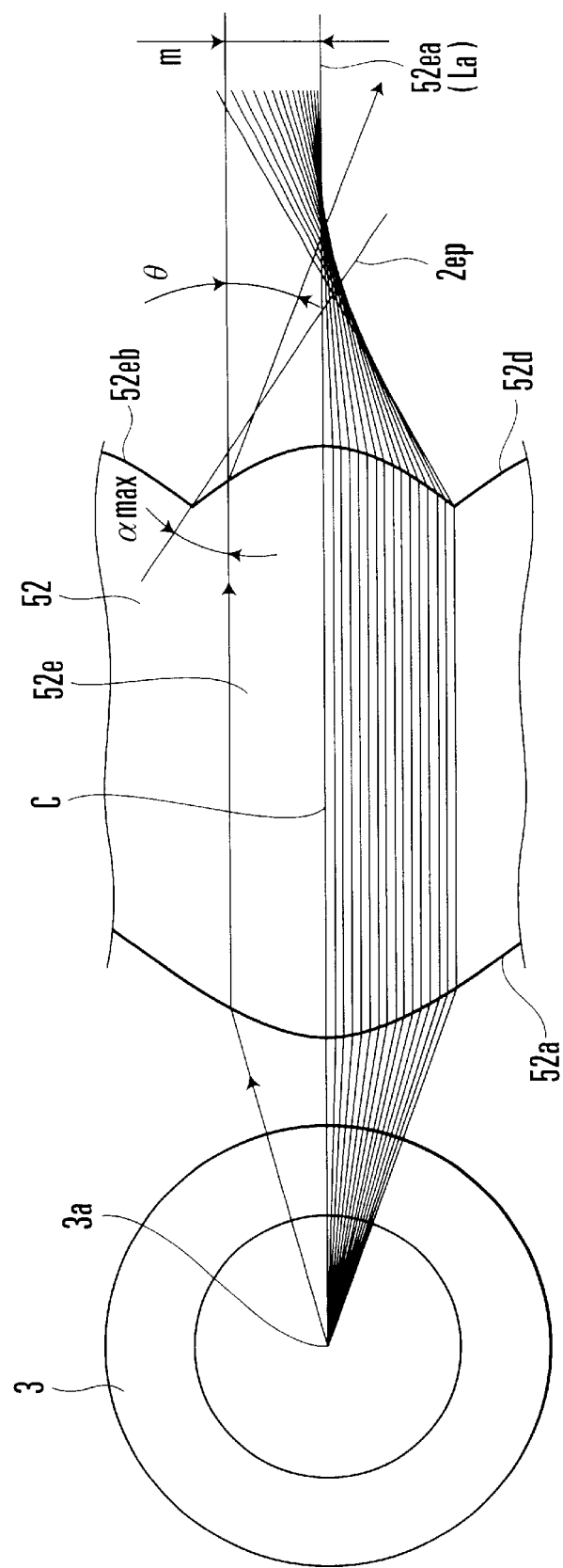
FIG. 10 is a vertical sectional view taken in the direction of diameter of the flash discharge tube of the flash device according to the fourth embodiment showing in part a distribution of rays of light.

In this case, a condition under which total reflection takes place to cause a loss is as follows. As shown in FIG. 10, the condition is brought about when the inclination of peripheral parts around the convex lens group (positive lens group) 52e provided on the exit surface of the optical prism 52 exceeds a critical angle. In order to avoid such a condition, the tangent line 2ep of a peripheral part of each of the small cylindrical lenses 52e must be arranged to have the angle of its inclination not exceeding the following range.

With the refractive index of the material used for the optical prism 52 assumed to be N and the maximum value of the inclination of the tangent line 2ep of the end part of each small lens 52e with respect to an optical axis La assumed to be αmax, the range is expressed as follows:

$$\alpha max > 90° - \sin^{-1}(1/N) \quad (3)$$

The range shown above is a necessary condition. In actuality, however, the light emitting part of the flash discharge tube is not a point light source but has a certain size. Hence, angular components which spread to a certain extent come to the exit surface of an actual optical prism.

Therefore, even in a case where the range shown above as a necessary condition is satisfied, some loss might be still caused by total reflection. In view of this possibility, the refractive power of the above-stated small convex lenses is preferably arranged to be the weakest of refractive powers necessary for obtaining the widest necessary illumination range.

Again referring to FIGS. 1 and 2, the manner in which the first embodiment is set to have the desired range of the refractive powers is next described. As shown in FIGS. 1 and 2, when the maximum parted distance between the cylindrical lenses 2e and 1a is assumed to be L, the pitch (spacing) distance between one cylindrical lens and another is assumed to be P, and a paraxial focal length of the cylindrical lenses 2e is assumed to be D, an efficient variable-illumination-angle illumination optical system can be formed to be in an adequate size and to have an adequate optical performance by setting the relation among these values L, P and D as shown below.

With the distance L between the optical prism 2 and the optical panel 1 required for varying the illumination angle assumed to be expressed in mm, the distance L is preferably within the following range:

$$0.5 \leq L \leq 4.0 \quad (4)$$

The minimum value "0.5 mm" of the distance L shown above is determined according to mechanical restrictions for moving the optical system. In other words, it is difficult to actually move in parallel a panel surface which has a relatively wide effective range, like in the case of the first embodiment, while uniformly keeping a spacing distance between the optical prism 2 and the optical panel 1. More specifically, depending on the method for guiding light, the panel tends to partially slant or to bring about some hysteresis in making a reciprocating motion. Besides, depending on the method of holding, a posture error brings about a slant. However, since it is not easy to correctly hold the panel, a small mechanical error causes a great change of the optical characteristic of the optical system.

Further, if the panel spacing distance is too narrow, control over a driving system and the accuracy in detecting the distance to the panel would necessitate some special arrangement, which prevents reduction in cost.

In view of these problems, the first embodiment of the invention is arranged to have the minimum value of a full stroke of movement required between the optical prism 2 and the optical panel 1 for varying the illumination angle set at 0.5 mm as a minimum value for avoiding the adverse effects mentioned above. The arrangement of the invention is based on a concept that an illumination-angle varying mechanism can be formed at low cost at least if the full stroke value is not less than the minimum value.

The maximum value "4.0 mm" of the distance L, on the other hand, is decided according to the whole size of the illumination optical system, because a reduction in size of the illumination optical system is one of important objects of the invention. If a maximum allowable distance between the optical prism 2 and the optical panel 1 is arranged to be longer than a necessary distance, the size of the whole optical system would become too large.

In accordance with the method of the invention, the maximum amount of movement allowable to the illumination-angle varying mechanism is much smaller than the amount of movement of the conventional zoom flash device. If this amount is increased, the merit of reduction in size of the present method would be lessened. In view of this, the maximum value of the amount of movement is set at the above-stated value.

An illumination-angle varying rate is next described. To restrict an illumination-angle varying action, the refractive power of the cylindrical lenses 2e is preferably determined according to the following relation by using the paraxial focal length D and the pitch distance P of the cylindrical the lenses 2e:

$$P/2 \leq D \leq 2 \times P \quad (5)$$

The relation shown above roughly restricts the configuration of each cylindrical lens. What is meant by the relation shown above is described in detail below with reference to the configuration of the first embodiment.

The paraxial focal length D which indicates the refractive power of the cylindrical lenses 2e represents a part whereby the light-collecting and light-diffusing actions of the illumination optical system are controlled. The illumination-angle varying optical characteristic is determined almost solely by this part. The shorter the focal length is, the greater the possible amount of varying the illumination angle with a small amount of movement. The longer the focal length is, the more gradually the illumination angle is variable with a small amount of movement.

Therefore, there is a certain amount of design latitude according to the mechanical arrangement of a zoom system employed. There is no optimum value. With priority given to reduction in size of the mechanical control system, if accurate position control becomes possible by somewhat increasing the cost, the focal length D is preferably arranged to be short. Further, in a case where priority is given to optical performance and cost by allowing some increase in size, an efficient illumination-angle varying optical system can be formed without difficulty by setting the focal length D at a longer length.

In actually controlling the illumination angle, the pitch distance P which corresponds to the size of aperture parts of the cylindrical lenses has a close relation to the control, like the focal length of the cylindrical lenses.

More specifically, after the light emitted from the light source center 3a is made to be approximately in parallel with the optical axis by the optical prism 2, the degree of diffusion is adjusted by the cylindrical lenses provided on the exit surface. However, even if these lenses are arranged to have the same focal length, the degree of diffusion varies with the size of the aperture part. The luminous intensity distribution can be made to have a greater degree of diffusion with the aperture arranged to be wider. The distribution, however, would have a smaller degree of diffusion if the aperture is arranged to be narrow.

Further, if the aperture is wider than a maximum necessary size, the quantity of light components totally reflected by the lens surfaces increases to prevent the illumination angle from being efficiently varied, as mentioned in the foregoing. In a case where the aperture is narrower than a minimum necessary size, it is impossible to widen the illumination angle up to a necessary angle no matter how much the amount of movement is increased.

Therefore, the condition of the range shown by the formula (5) above must be satisfied in order to form a variable-illumination-angle illumination device of the kind described above.

In the formula (5), a relation to the pitch distance P is shown on the basis of the paraxial focal length D of the cylindrical lenses. In a case where the paraxial focal length D is equal to or less than P/2, the illumination angle varies too much for adequate control. Beside, such a paraxial focal length causes an increase also in the loss due to total reflection and is, therefore, not desirable. On the other hand, a paraxial focal length D larger than 2P causes the illumination angle to become insufficiently variable to causes an increase in size and is, therefore, also not desirable.

Meanwhile, a Fresnel lens surface 11a is formed at the optical panel 1 on the side of the shooting object to collect light in the axial direction of the flash discharge tube, as shown in FIGS. 3 and 4.

In the case of the first embodiment of the invention, the light from the flash discharge tube is efficiently collected and diffused for a sectional area in the direction of diameter of the flash discharge tube by moving the optical prism and the optical panel relative to each other as shown in FIGS. 1 and 2. However, for a light component in the axial direction of the flash discharge tube, it is difficult to efficiently collect the light, because the length of the light source is too long.

To solve this problem, in the first embodiment, the Fresnel lens 11a is arranged on the object side of the optical panel 11 to collect the light in the axial direction of the flash discharge tube. Further, as shown in FIGS. 3 and 4, the Fresnel lens 11a is not covering the whole surface of the optical panel 11 but is formed only at the parts of the optical panel 11 located on the outer sides of the effective arc length of the flash discharge tube.

This is because, if the Fresnel lens is within the effective arc length of the flash discharge tube, it would disturb the luminous intensity distribution in the vertical direction to lower efficiency. Further, even if the Fresnel lens is formed at the center part of the flash discharge tube, the light-collecting efficiency is not always enhanced by such an arrangement, because, in that case, the Fresnel lens surface is located near to the light source.

With the Fresnel lens 11a arranged on two sides of the optical panel 11 as shown in FIGS. 3 and 4, the incident angle of rays of light can be limited to a certain degree, so that light can be efficiently collected.

However, as mentioned above, the light-collecting state in the axial direction of the flash discharge tube is hardly variable by moving the optical prism and the optical panel relative to each other. The first embodiment is, therefore, arranged to have the Fresnel lens formed as shown in FIGS. 3 and 4 in such a configuration that gives a luminous intensity distribution characteristic corresponding to the widest necessary range of illumination.

The variable-illumination-angle illumination device according to the first embodiment effectively functions for the sectional area in the direction of diameter of the flash discharge tube if the size of the light source is sufficiently small for the optical system. However, in a case where the size of the light source is too large for the optical system, the variable-illumination-angle illumination device does not effectively function. In view of this, it is ideal to use a light source which is close to a point light source and to form the optical prism and the optical panel to be rotationally symmetric.

The first embodiment has an ideal configuration only for a certain sectional area. However, it permits not only a reduction in size but also a high rate of efficiency by utilizing total reflection. Therefore, the first embodiment, on the whole, excels the conventional device in luminous intensity distribution characteristic and other optical characteristics.

The setting values of the illumination optical system of the first embodiment are described in concrete numerical values below with reference to FIGS. 1 and 2. The configuration of the whole optical system is first described. Referring to FIG. 2, the total length f of the optical system is f=9.4 mm in the farthest parted state and f=7.9 mm in the closely-put-together state. The aperture g of the optical prism 2 is g=10.0 mm. The whole volume of the optical system is only ⅓ to ¼ of that of the conventional zoom flash device.

The arrangement of the light-diffusing part of the first embodiment is as follows. The pitch distance P of the cylindrical lenses of the optical prism 2 is uniformly set at P=1.5 mm in the case of the first embodiment. The maximum amount of movement L of the light emitting unit, which includes the optical prism 2, the flash discharge tube 3 and the reflector 4, with respect to the optical panel 1 is L=1.5 mm. The focal length D of each of the cylindrical lenses is uniformly set at D=1.75 mm.

All of these values are at about the middle of the ranges defined by the formulas (4) and (5) and thus give an almost ideal configuration.

The cylindrical lens surfaces formed on the optical panel 1 to have a negative refractive power are arranged in a configuration which is conversely identical with the cylindrical lens surfaces formed on the optical prism 2 with a convex shape inversely arranged in a concave shape to perfectly fit in with each other, as shown in FIGS. 1 and 2. When these converse lens surfaces are in close contact with each other, the refractive powers of these cylindrical lenses are completely offset by each other to allow a light flux collected within the optical prism to exit with the light-collecting characteristic kept intact. Therefore, an extremely efficient optical system can be formed.

Each of cylindrical lenses is in an aspherical shape having no spherical aberration. Therefore, the light component emitted from the center of the light source can be efficiently collected and diffused without being totally reflected by the cylindrical lens surfaces.

With the cylindrical lenses arranged to be in a shape of having no spherical aberration, if the light-emitting light source is sufficiently small with respect to the optical prism, the optical system can be arranged to have an extremely high efficiency.

In the first embodiment, the cylindrical lenses are formed integrally with the exit part of the optical prism. However, these cylindrical lenses may be arranged separately from the optical prism.

The cylindrical lenses which are provided on the optical prism and the optical panel in the first embodiment may be replaced with anamorphic lenses having refractive powers also in the axial direction of the light source 3. In the case of such a modification, the refractive power of the anamorphic lenses of the optical prism and that of the anamorphic lenses of the optical panel are arranged to be offset by each other. Such a modification applies not only to the first embodiment but also to other embodiments hereinafter described.

A second embodiment of the invention is next described with reference to FIG. 7. The second embodiment differs from the first embodiment in respect of the configuration of convex lenses formed on the exit surface 32d of an optical prism 32 and that of concave lenses formed on an optical panel 31 in a shape corresponding to the shape of the convex lenses. The second embodiment is arranged to minimize the amount of movement for obtaining an illumination-angle varying effect approximately equivalent to the effect obtained in the first embodiment.

With the exception of the above-stated point, the second embodiment is arranged in the same manner as the first embodiment. The convex lens surfaces of the cylindrical lenses are aspheric cylindrical surfaces with spherical aberration corrected.

Figure 7:
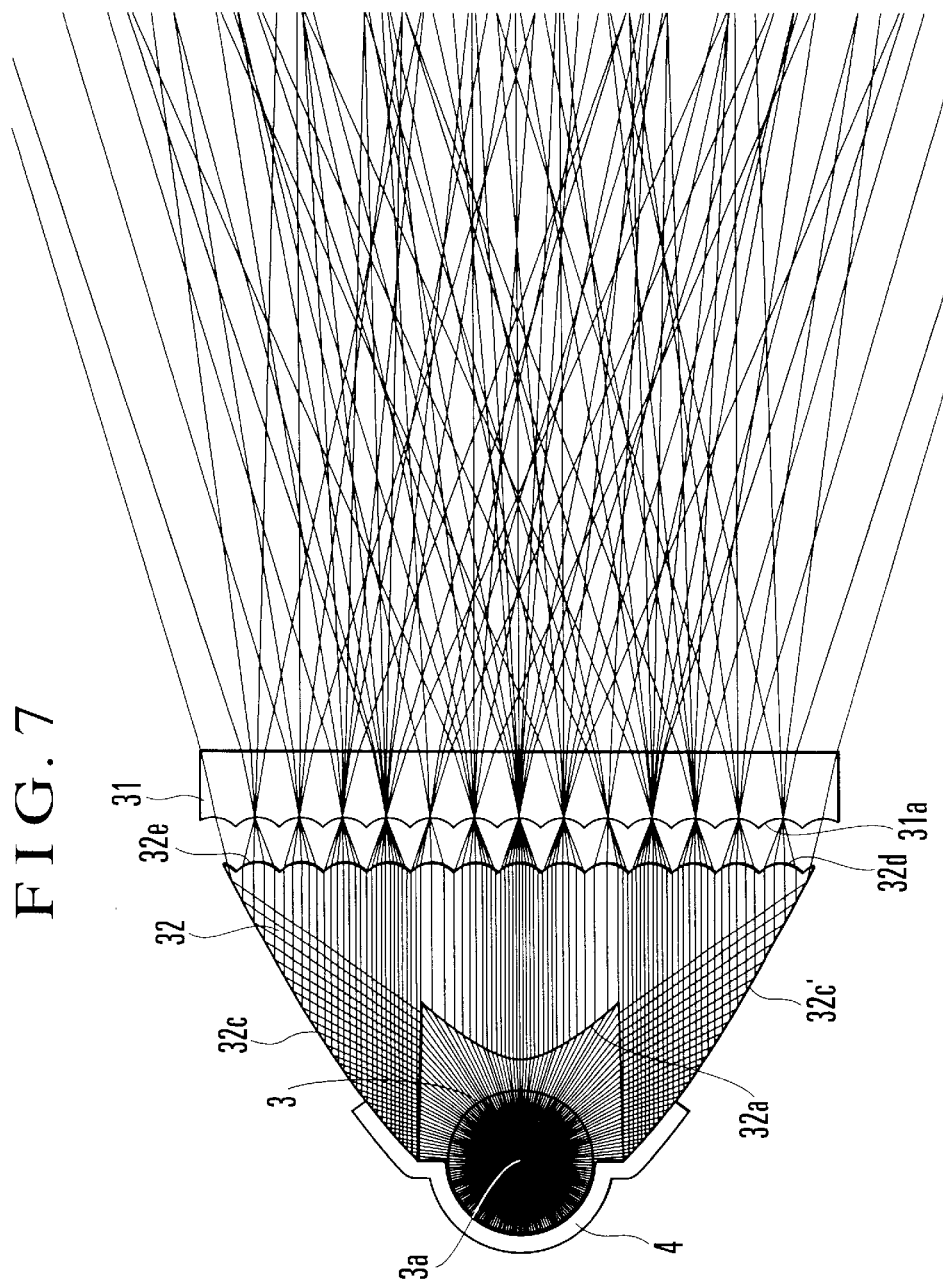
FIG. 7 is a vertical sectional view taken in the direction of diameter of a flash discharge tube of a flash device according to a second embodiment of the invention showing a distribution of rays of light in a light-diffusing state.

Referring to FIG. 7, the cylindrical lenses 32e of the optical prism 32 which forms a light-diffusing part and the cylindrical lenses 31a which are formed on the optical panel 31 to have a negative refractive power and such a configuration as to fit in with the cylindrical lenses 32e are in a configuration obtained by analogically reducing the configuration of the first embodiment approximately to one half thereof.

With the second embodiment arranged in this manner, if a light flux emitted from the light source center 3a is caused to be nearly in parallel with the exit optical axis by the entrance surface 32a and the total-reflection surfaces 32c and 32c' of the optical prism 32, the illumination angle can be varied to about the same degree as the illumination-angle varying degree in the first embodiment by moving the optical system an amount of movement which is nearly only one half of the amount of movement required in the first embodiment.

With the maximum parting distance between the cylindrical lenses 32e and the cylindrical lenses 31a assumed to be L, the paraxial focal length of the cylindrical lenses 32e assumed to be D and the pitch distance of the cylindrical lenses 32e assumed to be P, the configuration and size of the second embodiment are expressed in numerical values as follows:

$L=0.75$ mm, $D=0.85$ mm and $P=0.75$ mm

The maximum parting distance L comes close to the lower limit of the range indicated by the formula (4). The relation between the paraxial focal length D of the cylindrical lenses and the pitch distance P of the cylindrical lenses is at about the middle value of the range indicated by the formula (5).

As mentioned above, a maximum lens moving distance can be varied, without causing any change in the luminous intensity distribution characteristic, by analogically varying the convex and concave shapes, i.e., negative and positive refractive powers, of the cylindrical lenses which form a light-diffusing part. However, in this case, the sensitivity of each element of the optical system to changes of luminous intensity distribution becomes higher. Therefore, any vertical deviation or slanting of the relative positions of the corresponding lenses brings about a great change in the luminous intensity distribution characteristic.

However, a careful mechanical design thoroughly paying heed to this point makes it possible to arrange a variable-illumination-angle illumination optical system which is capable of varying the illumination angle to a great extent with a minimum necessary lens moving amount.

A third embodiment of the invention is next described with reference to FIG. 8. The third embodiment differs from the first embodiment and the second embodiment in respect of the configuration of convex lenses formed on the exit surface 42d of an optical prism 42 and that of concave lenses formed on an optical panel 41 in a shape corresponding to the shape of the convex lenses. The third embodiment is arranged to minimize the amount of movement for obtaining an illumination-angle varying effect larger than the effect obtained in the first embodiment.

With the exception of the above-stated point, the third embodiment is arranged in the same manner as the first embodiment. The convex lens surfaces 42e of the optical prism 42 are aspheric cylindrical surfaces with spherical aberration corrected.

The third embodiment is arranged to enhance the refractive power without changing the pitch distance of the exit surface 42d of the optical prism 42 from that of the first embodiment. An attempt to enhance the refractive power simply with spherical surfaces brings forth unnecessary totally-reflected light. Therefore, the configuration of the cylindrical surfaces is arranged to correct spherical aberration.

Figure 8:
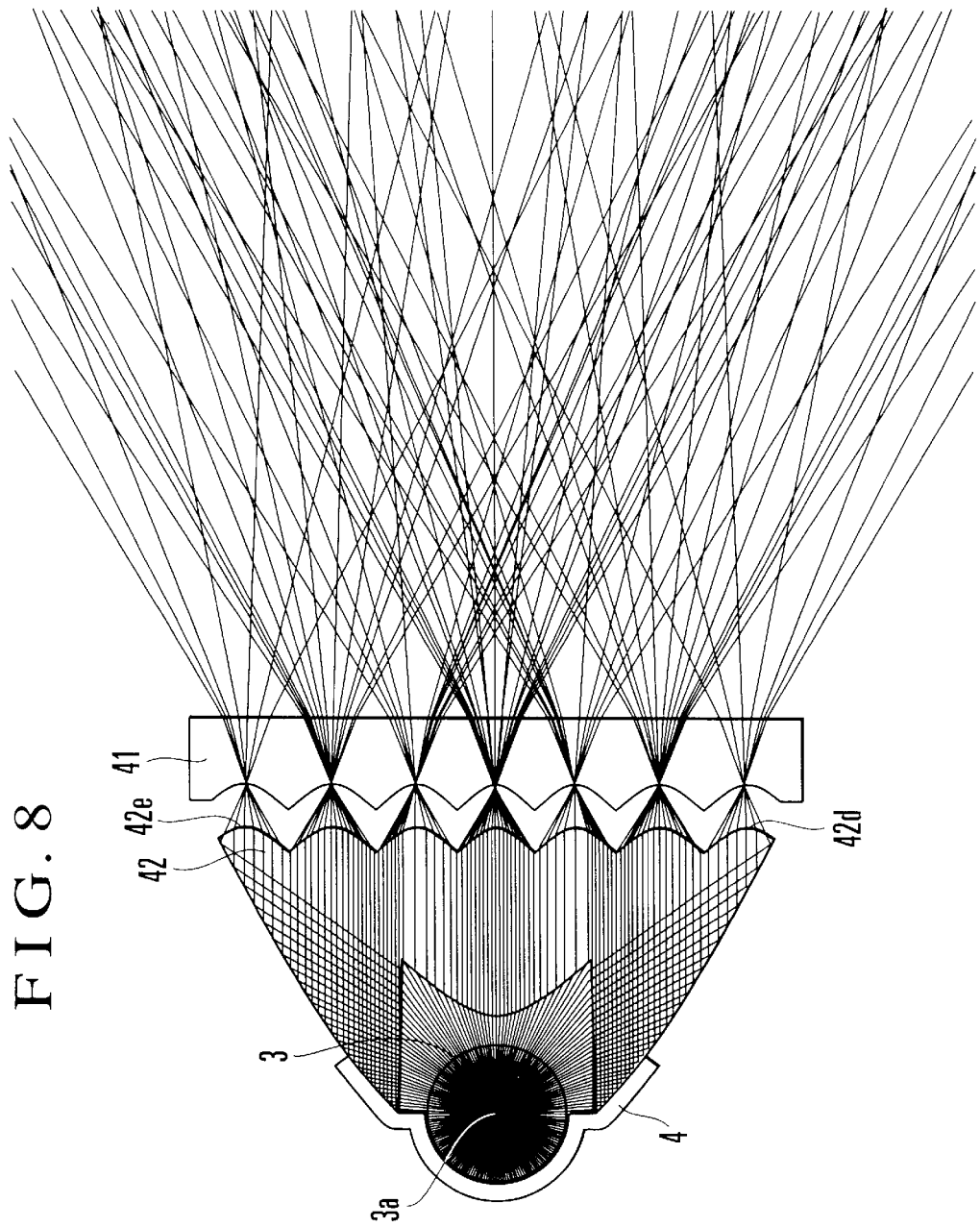
FIG. 8 is a vertical sectional view taken in the direction of diameter of a flash discharge tube of a flash device according to a third embodiment of the invention showing a distribution of rays of light in a light-diffusing state.

As apparent from FIG. 8, the illumination angle is caused to vary to a great extent with only one half of the amount of movement of the optical system required in the first embodiment.

Even with the amount of movement for varying the illumination angle thus extremely lessened, correction is made as necessary by means of the aspherical cylindrical lenses, so that light-collecting control can be efficiently accomplished without any light quantity loss caused by total reflection.

As indicated also by the traces of rays of light in FIG. 8 in the third embodiment, a light flux exiting from the light source center 3a is efficiently collected and diffused with a small amount of movement. However, in actuality, some totally-reflected light tends to take place at the exit surface 42d of the optical prism 42 if the size of the light-emitting part of the light source is too large for the whole optical system, because the light source has a certain size. In a case where the actual size of the light source is sufficiently small for the whole optical system and where reduction in size takes priority at the expense of a certain loss of light quantity, a highly effective illumination-angle varying mechanism can be obtained in accordance with the arrangement of the third embodiment.

With the maximum parting distance between the corresponding lenses assumed to be L, the paraxial focal length of the cylindrical lenses assumed to be D and the pitch distance of the cylindrical lenses assumed to be P, the third embodiment is expressed in numerical values as follows:

$L=0.75$ mm, $D=0.75$ mm and $P=1.50$ mm

The maximum lens parting distance L comes close to the lower limit of the range indicated by the formula (4). The relation between the paraxial focal length D of the cylindrical lenses and the pitch distance P of the cylindrical lenses is near to the lower limit value of the range indicated by the formula (5), like in the case of the first embodiment.

In short, the third embodiment is arranged to be capable of varying the illumination angle to a maximum degree with a minimum amount of movement.

A fourth embodiment of the invention is next described with reference to FIGS. 9 and 10. The fourth embodiment differs from the first, second and third embodiments in that the spherical aberration of the convex lens shape of the exit surface 52d of an optical prism 52 is corrected and the corresponding concave lens shape of an optical panel 51 is arranged in combination with the exit surface 52d of the optical prism 52. The fourth embodiment is arranged to further improve the luminous intensity distribution characteristic obtainable by varying the illumination angle.

The first, second and third embodiments are arranged to collect light on a straight line by correcting the spherical aberration of the cylindrical lenses. In respect to the luminous intensity distribution thus obtained, however, although a nearly uniform luminous intensity distribution is obtainable by reducing a light quantity loss due to total reflection for the light from the center part of the light source, the illuminance of the peripheral part inevitably tends to become lower than that of the center part.

The fourth embodiment is intended to make a more uniform luminous intensity distribution obtainable at each of different illumination angles. For this purpose, the configuration of the exit surface 52d of the optical prism 52 is arranged differently from the other embodiments in particular. With the exception of this point, the fourth embodiment is arranged in the same manner as the first embodiment.

The basic concept of the fourth embodiment is as follows. All rays of light emitted from the light source 3 are made to be in parallel with the exit optical axis through the refraction by the entrance surface 52a and the reflection by the total-reflection surfaces 52c and 52c' of the optical prism 52, and the pitch of cylindrical lens surfaces is assumed to be small enough to cause all light components having reached the exit surface 52d to be uniformly distributed irrespective of their positions of arrival at the exit surface 52d.

Under this condition, each of the cylindrical lens surfaces formed on the exit surface of the optical prism 2 can be considered to have an incident light flux having uniform angular components in parallel with the exit optical axis. Then, a luminous intensity distribution characteristic which is uniform over the whole necessary illuminating range is obtainable by uniformly distributing the light components obtained in parallel with the exit optical axis at each of the cylindrical lenses.

For actually distributing light, the fourth embodiment is arranged to have the configuration of each of the cylindrical lens surfaces decided to be as follows.

By using the center of the optical axis 52ea of each cylindrical lens 52e as a datum point, a distance (of an exit position) from the optical axis 52ea and an angle obtained after passing the cylindrical lens 52e are restricted to a certain fixed relation to each other.

In the case of the fourth embodiment, in particular, the distance "m" between the optical axis center 52ea and an exit position of each cylindrical lens 52e and an angle θ obtained after passing through the cylindrical lens 52e are arranged to be in a proportional relation, which can be expressed by the following generic formula:

$$\theta = k \times m \quad (6)$$

wherein k represents a proportional constant.

The configuration of the exit surface 52d of the optical prism 52 is described below in detail with reference to FIG. 10.

Figure 9:
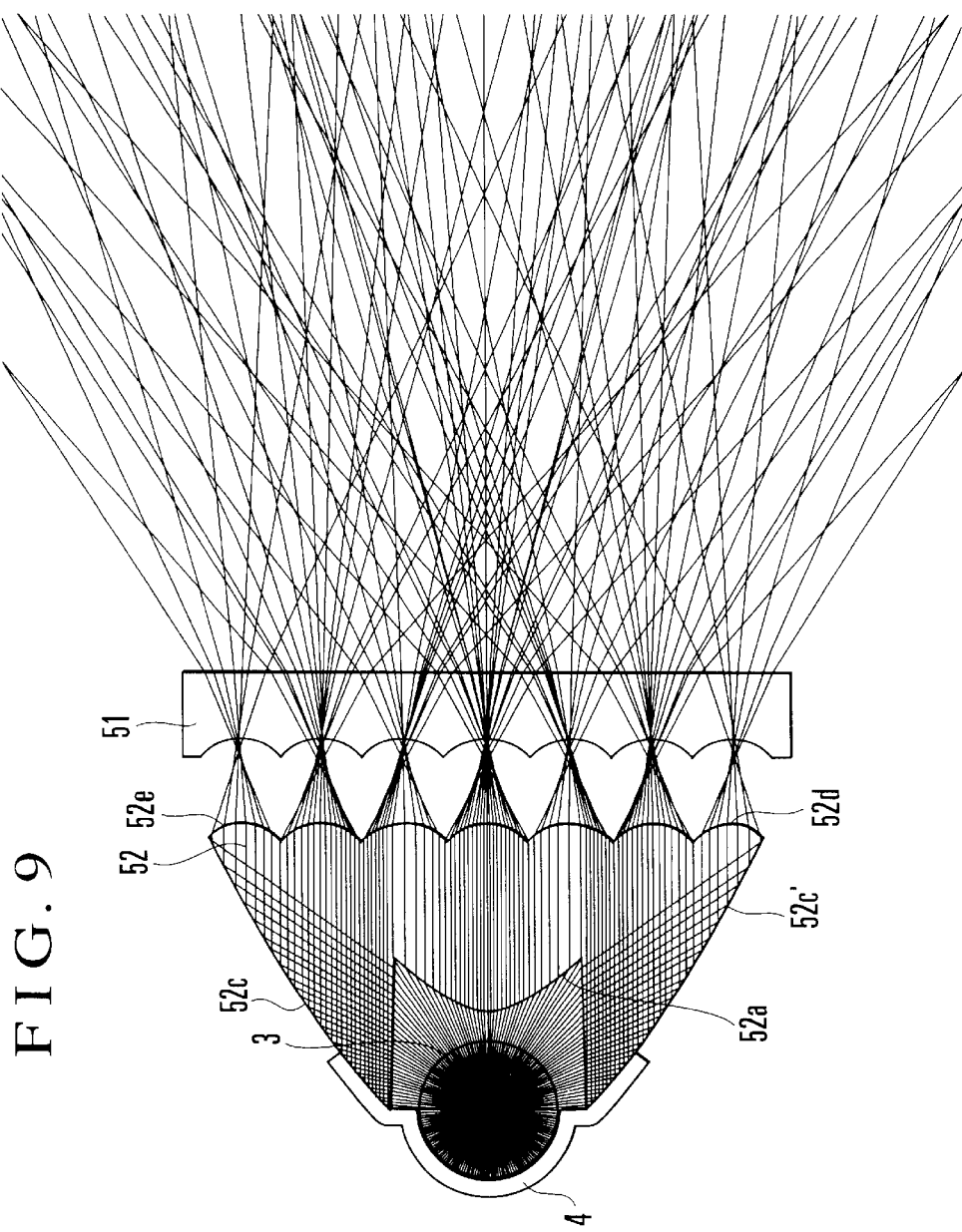
FIG. 9 is a vertical sectional view taken in the direction of diameter of a flash discharge tube of a flash device according to a fourth embodiment of the invention showing a distribution of rays of light in a light-diffusing state.

FIG. 10 is an enlarged view showing a part of the variable-illumination-angle illumination optical system shown in FIG. 9. The characteristic of one of the cylindrical lens surfaces 52eb is described as follows.

In FIG. 10, reference numeral 52ea denotes the optical axis of a particular cylindrical lens 52e. The cylindrical lens 52e is formed in a shape vertically symmetric with respect to the optical axis 52ea.

For simplification, the upper surface above the center of the optical axis 52ea is described with reference to the generic formula while the lower surface below the center of the optical axis 52ea is described with reference to the traces of actual rays of light shown in FIG. 10. A light flux exiting from the light source 3 is either refracted by an entrance surface 52a or reflected by total-reflection surfaces (not shown) in such a way as to become approximately parallel with the optical axis 52ea.

After that, the light is refracted by the exit surface 52d to be converted into predetermined angular components. Variations taking place at this time are restricted in accordance with the above formula (6) in such a way as to give a uniform illuminance distribution on an illuminating surface.

The fourth embodiment is expressed in practical numerical values as follows. The pitch distance P of the cylindrical lenses 52e is 1.5 mm which is the same as in the first and third embodiments. The proportional constant k is set at "40".

In this case, a distance from the center to the farthest position is 0.75 mm. For this position, the maximum angle after the angular conversion becomes 30 degrees. In the case of the example shown in FIG. 10, the positions of the light components located below the optical axis 52ea are shifted 0.05 mm downward one by one. As for the angular conversion, the surface shape is set in such a manner that the angle at which the light components bend toward the optical axis increases by 2 degrees accordingly as they are located farther downward. With the fourth embodiment arranged in this manner, each of the angular components uniformly reaches the illuminating surface, so that an ideally uniform luminous intensity characteristic can be obtained on the whole.

A fifth embodiment of the invention is next described with reference to FIG. 11. The fifth embodiment is characterized in that the convex lens shape of the exit surface 62d of an optical prism 62 is partially varied. More specifically, the configuration of the exit surface 62d of the optical prism 62 and that of the entrance surface of an optical panel 61 are arranged to have the pitch distance and the refractive power of a center part differ from those of peripheral parts. The details of the fifth embodiment are described below with reference to FIG. 11.

Figure 11:
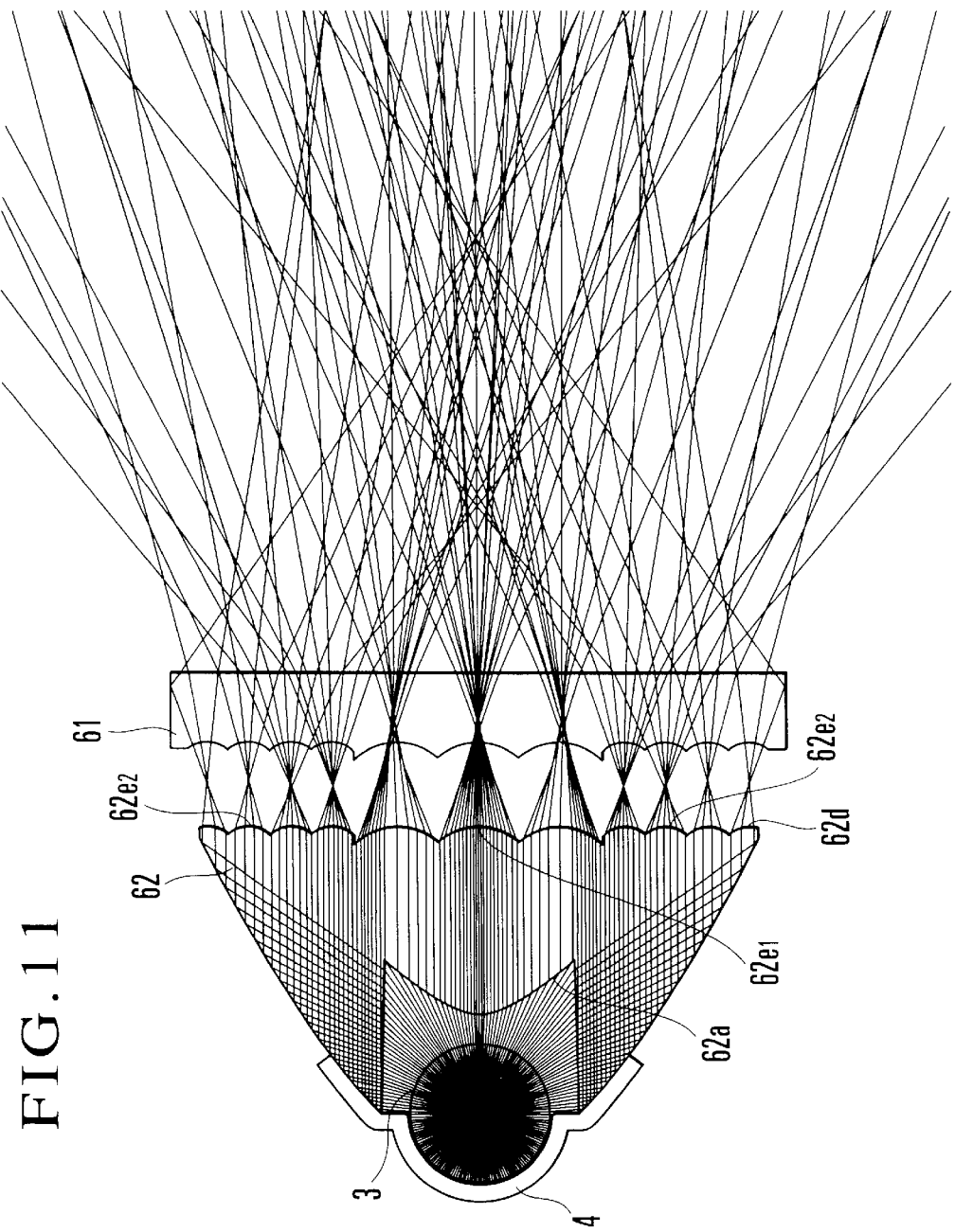
FIG. 11 is a vertical sectional view taken in the direction of diameter of a flash discharge tube of a flash device according to a fifth embodiment of the invention showing a distribution of rays of light in a light-diffusing state.

As shown in FIG. 11, the optical prism 62 has aspherical cylindrical lenses 62e1 at its middle part and aspherical cylindrical lenses 62e2 at peripheral parts. The aspherical cylindrical lenses 62e2 have a relatively wide pitch distance and thus have a relatively weak refractive power. The aspherical cylindrical lenses 62e2 have a relatively narrow pitch distance and thus have a relatively strong refractive power.

The fifth embodiment is intended to obtain a uniform luminous intensity distribution for a necessary illumination range, like the fourth embodiment, and more particularly to obtain the uniform luminous intensity distribution over a widest illumination range. For this purpose, the fifth embodiment is arranged in the manner as described above, for the following reason.

As mentioned in the foregoing description of the first embodiment, a light component controlled at a position near to the light source does not much spread if the size of the light source is small. However, if the light source is large, the same light component becomes a widely spread component to include not only a part which enters in parallel with the optical axis in the stage of reaching the exit surface 62d of the optical prism 62 but also some other parts.

In actuality, therefore, an incident light component which comes in through the front entrance surface 62a of the optical prism 62 to be directly refracted into a parallel state, i.e., a light component reaching the middle part of the exit surface 62d of the optical prism 62, has a wider luminance intensity distribution than what is shown in FIG. 11.

Meanwhile, light components which come sideway from the light source are totally reflected along the exit optical axis. However, since the reflection surfaces are located relatively far away from the light source, these components include a smaller amount of such parts that are spread by the size of the light source more than the above-stated directly controlled component.

Therefore, in order to arrange the illumination device to be capable of obtaining an approximately uniform luminous intensity distribution characteristic by the whole light exit surface 62d of the optical prism 62, the degree of diffusion of the peripheral parts of the optical panel 61 must be arranged to be greater than that of the middle part of the optical panel 61. In the case of the fifth embodiment, to uniformalize the illuminance distribution obtained at the time of exiting from the exit surface 62d of the optical prism 62, the degree of diffusion is arranged to vary with parts within the optical panel 61. For this purpose, according to the fifth embodiment, the exit surface 62d of the optical prism 62 is made to have different optical characteristics.

The above-stated arrangement enables the fifth embodiment to control and uniformalize not only the luminous intensity distribution at the exit surface 62d but also the luminous intensity distribution on the illuminating surface. The fifth embodiment is arranged, as mentioned above, to have two different diffusing characteristics, one at the middle part and the other at the peripheral parts. However, the number of kinds (modes) of diffusion is not limited to two and may be more than two. For example, the refractive power of the cylindrical lenses may be arranged to vary stepwise according to the size of the light source, or according to the degree of diffusion of light reaching the exit surface of the optical prism. Such an arrangement gives a more uniform luminous intensity distribution characteristic.

A sixth embodiment of the invention is next described with reference to FIGS. 12 and 13. In the sixth embodiment, the configuration of the exit surface 72d of an optical prism 72 is formed in part to be prism surfaces. More specifically, the peripheral parts of the optical prism 72 and an optical panel 71 are formed in the shape of prism surfaces while the middle exit surface of the optical prism 72 and that of the optical panel 71 are respectively formed to be in the shape of aspherical cylindrical surfaces. The details of the sixth embodiment are described below with reference to FIGS. 12 and 13.

Figure 12:
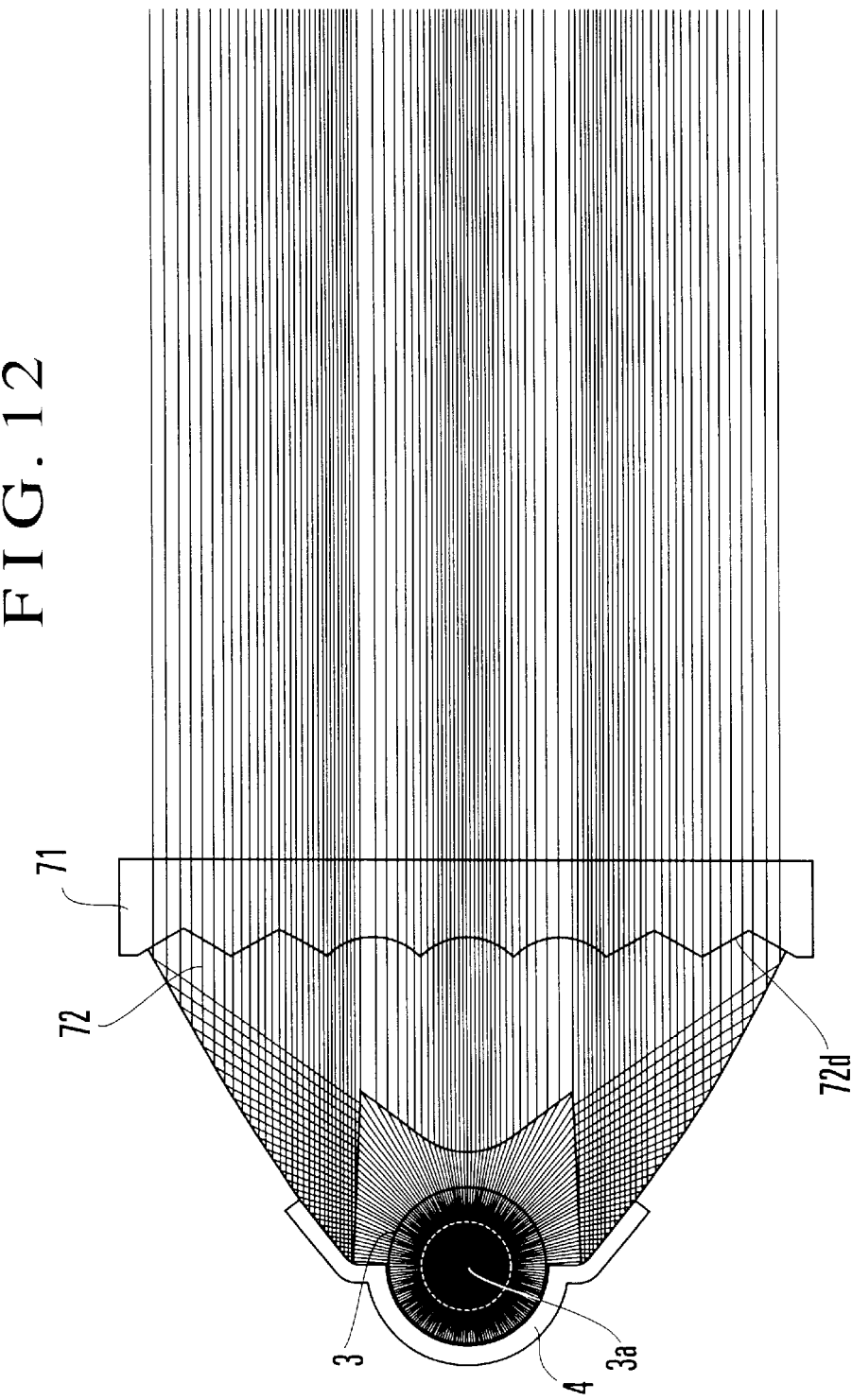
FIG. 12 is a vertical sectional view taken in the direction of diameter of a flash discharge tube of a flash device according to a sixth embodiment of the invention showing a distribution of rays of light in a light-collecting state.
Figure 13:
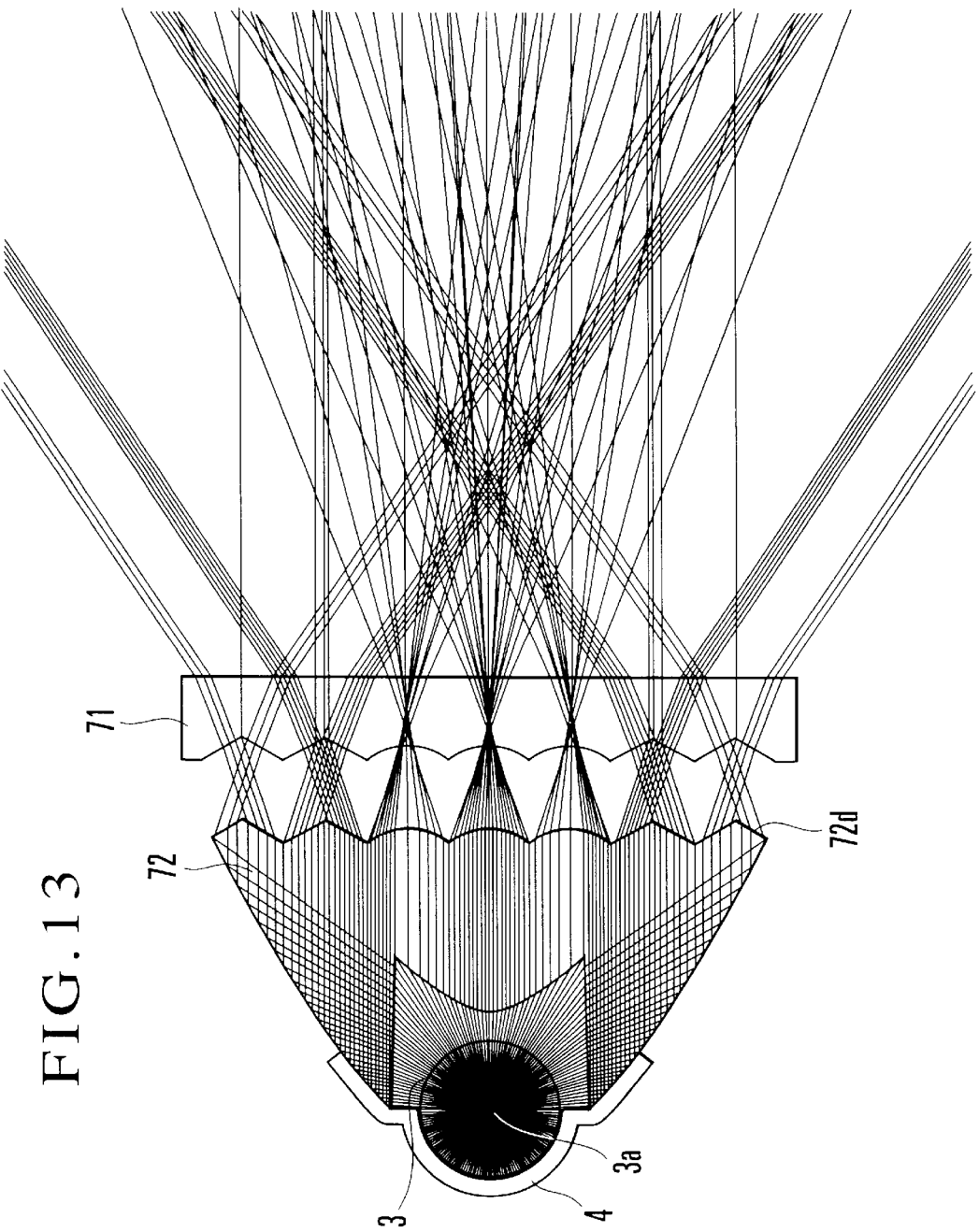
FIG. 13 is a vertical sectional view taken in the direction of diameter of the flash discharge tube of the flash device according to the sixth embodiment showing a distribution of rays of light in a light-diffusing state.

FIG. 12 shows the sixth embodiment in the best light-collecting state. A light flux exiting from the light source center 3a is converted by the optical prism 72 into a light component which is approximately parallel with the optical axis. The refractive powers of the cylindrical lenses and prism surfaces on the exit surface 72d of the optical prism 72 are canceled respectively by the corresponding surfaces of the optical panel 71, which are formed in such a way as to fit in with the surfaces of the optical prism 72. The parallel light component reaches an illuminating surface with the light-collecting state kept unchanged.

The light-diffusing state in the sixth embodiment is described below with reference to FIG. 13. As apparent from the illustration of FIG. 13, light components which correspond to the prism surface parts are converted to a great angular degree.

As mention above in the description of the fifth embodiment, if the same refractive power as that of the middle part is applied also to the light component reaching the peripheral parts, the peripheral parts would have a low diffusion varying rate and thus would require a greater change of diffusibility.

Therefore, the sixth embodiment is arranged to use the prism surfaces for greater changes of diffusibility at the peripheral parts of the light exit surface 72d of the optical prism 72. The use of such an optical prism makes it possible to change a light component in the direction of the optical axis to an extreme degree. Therefore, a light component of a luminous intensity distribution which tends to remain around the middle part can be effectively diffused toward the peripheral parts to obtain a uniform luminous intensity distribution on the whole.

In the case of FIG. 12 which shows, by way of example, traces of rays of light exiting from the light source center, the luminous intensity distribution appears to be not uniform. However, since the actual size of the light source is large for the whole optical system, rays of light come to parts other than the parts shown, so that a uniform luminous intensity distribution can be obtained on the whole.

A seventh embodiment of the invention is next described with reference to FIGS. 14 to 17. In the seventh embodiment, a negative refractive power required for canceling the refractive power of cylindrical lenses formed on an optical prism 82 is imparted to the exit surface of an optical panel 81 instead of to the entrance surface thereof.

In a case where the size of the light source is sufficiently small with respect to the whole optical system, it is possible to obtain an optical system which is equivalent to the optical system of each of other embodiments described above without arranging the configuration of the optical panel to fit in with that of the exit surface of the optical prism, like in the case of the seventh embodiment. The details of the seventh embodiment are described below with reference to FIGS. 14 to 17.

Figure 14:
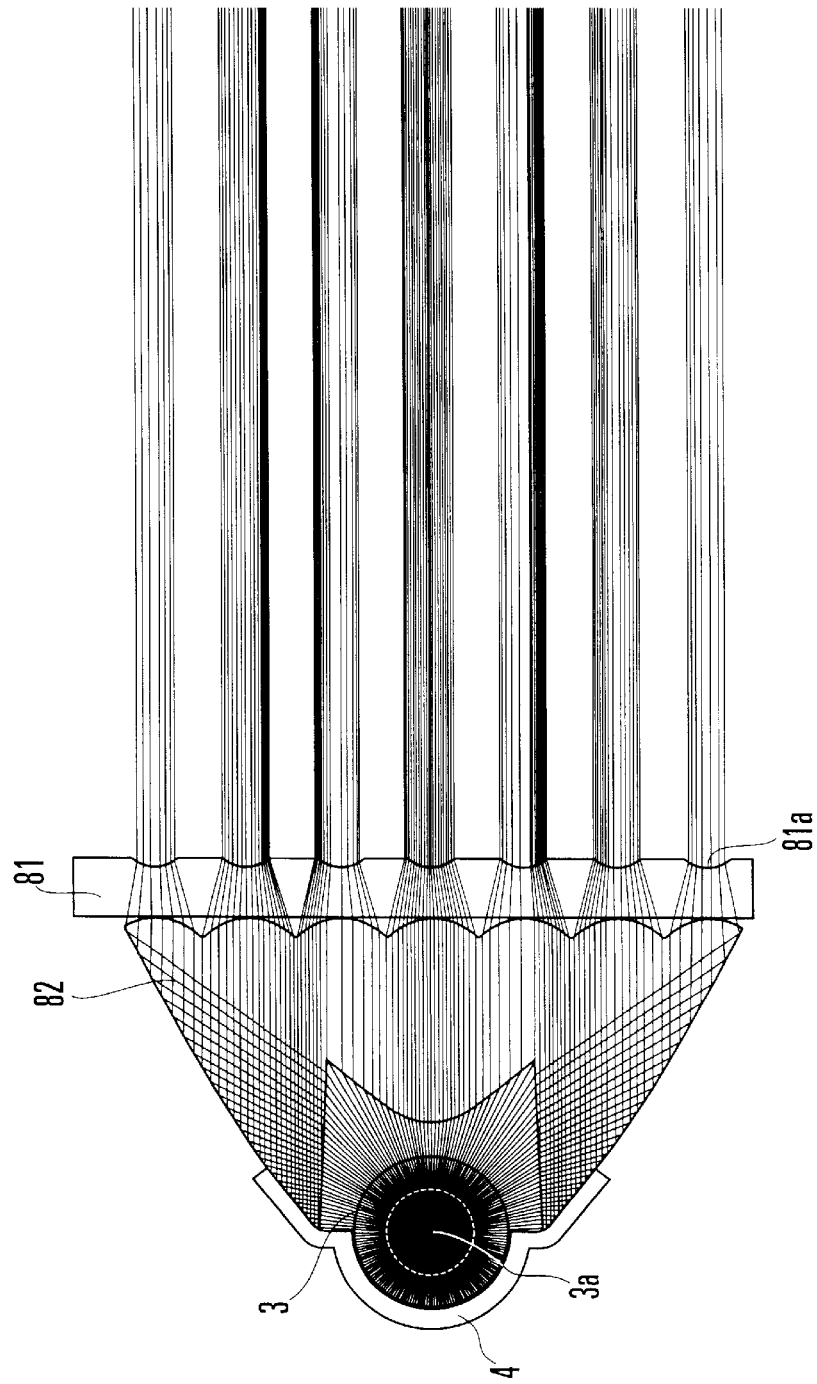
FIG. 14 is a vertical sectional view taken in the direction of diameter of a flash discharge tube of a flash device according to a seventh embodiment of the invention showing a distribution of rays of light in a light-collecting state.

FIG. 14 shows the seventh embodiment in a light-collecting state. In this state, the optical prism 82 and the optical panel 81 are in close contact with each other. Cylindrical surfaces 81a having a negative refractive power are formed on the illuminating surface side of the optical panel 81 in such a way as to cancel the light-collecting characteristic of the optical prism 82 in the state shown in FIG. 14.

With the seventh embodiment arranged in this manner, a light flux emitted and exiting from the light source center 3a comes to illuminate the object of shooting in a state of being converted into a plurality of pencils of rays on the illuminating surface side of the optical panel 81.

Figure 15:
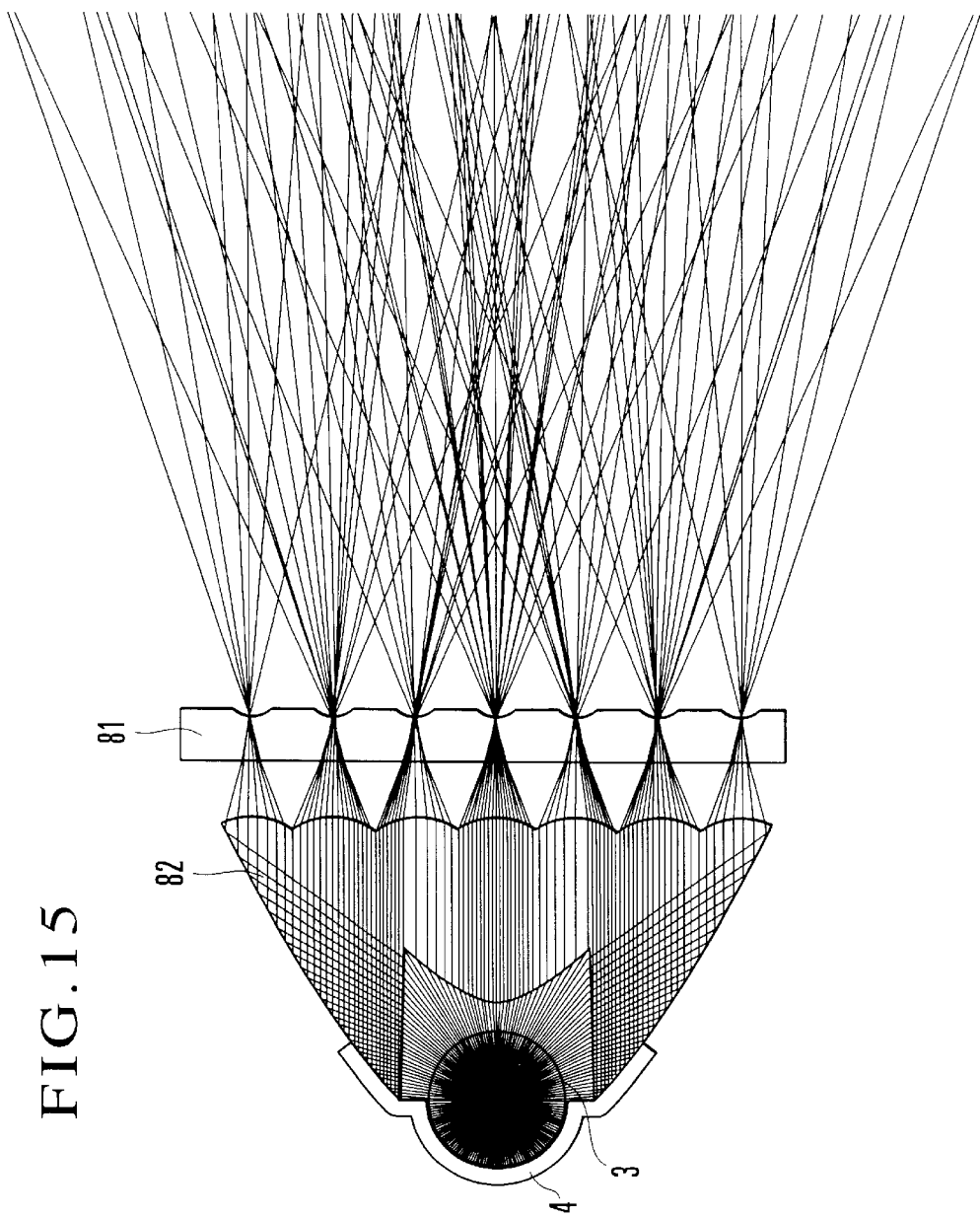
FIG. 15 is a vertical sectional view taken in the direction of diameter of the flash discharge tube of the flash device according to the seventh embodiment showing a distribution of rays of light in a light-diffusing state.

FIG. 15 shows the seventh embodiment in a light-diffusing state. In this case also, a desired luminous intensity distribution characteristic can be obtained by appositely adjusting the amount of relative movement of the optical prism 82 and the optical panel 81. The light-collecting state shown in FIG. 14 can be continuously changed into the light-diffusing state shown in FIG. 15. Therefore, the luminous intensity distribution can be caused to continuously vary according to the necessary range of illumination.

Figure 16:
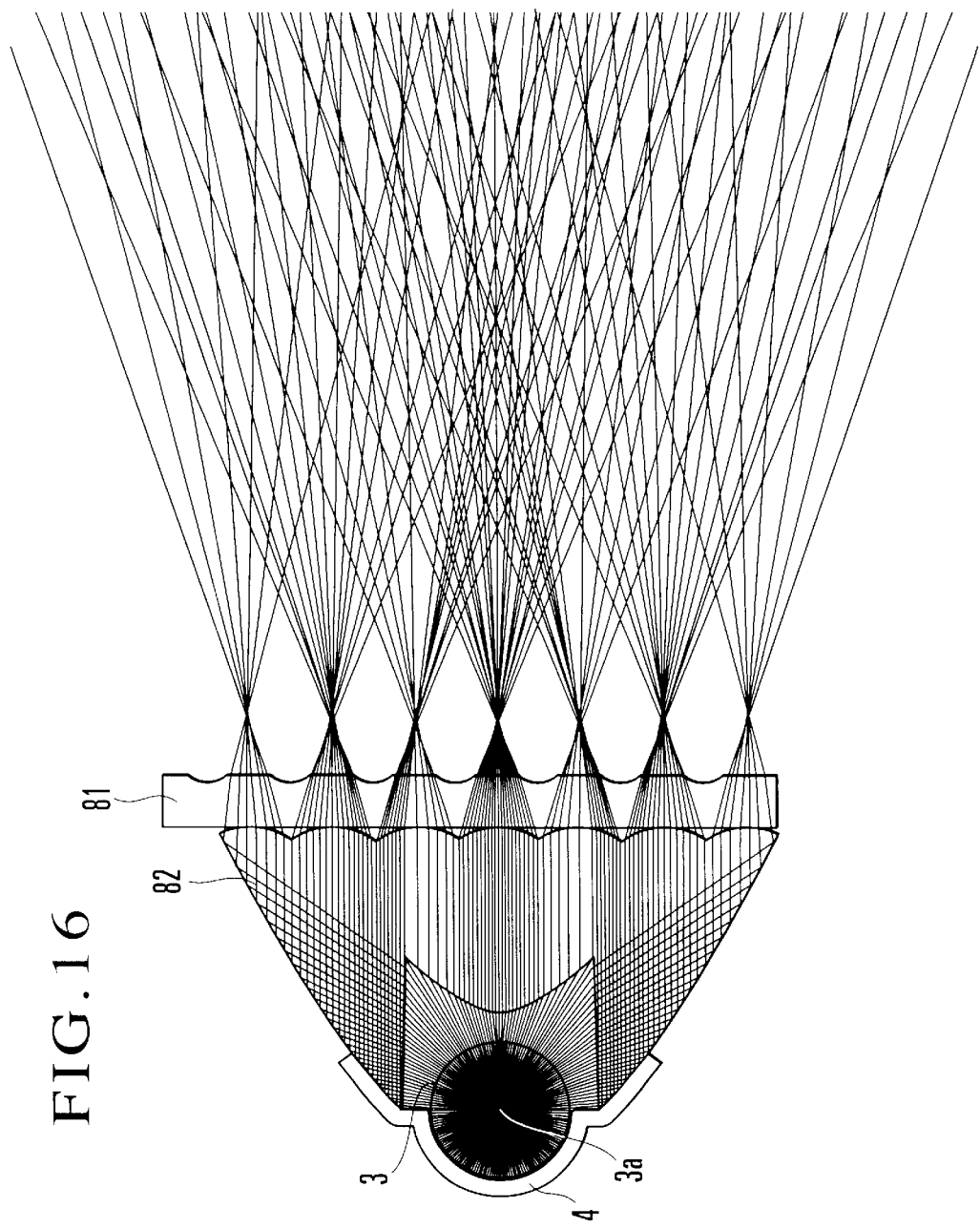
FIG. 16 is a vertical sectional view taken in the direction of diameter of the flash discharge tube of the flash device according to the seventh embodiment showing a distribution of rays of light in another light-diffusing state.

FIG. 16 shows another method for bringing the seventh embodiment into a light-diffusing state. In the case of FIG. 16, the light-diffusing state is obtained by shifting the relative positions of the optical panel 81 and the optical prism 82 in a direction perpendicular to the exit optical axis.

The method of shifting the relative positions of the optical panel 81 and the optical prism 82 in a direction perpendicular to the exit optical axis gives a light-diffusing state which is almost equivalent to the light-diffusing state shown in FIG. 15.

As apparent from the example shown in FIG. 16, the seventh embodiment is arranged on the basis of the concept that a light-diffusing state is obtainable by leading rays of light to the flat surface part of the optical panel 81. The example of FIG. 16 greatly differs from the example of FIG. 15 in that the state of the illumination device is variable only between two states, i.e., a light-collecting state and a light-diffusing state. In this case, a luminous intensity distribution characteristic obtained at an intermediate position is not suited for varying the angle of illumination.

With the seventh embodiment arranged in this manner, the binary change-over between light-collecting and light-diffusing actions can be adequately carried out within an extremely limited space by moving the optical system in a direction perpendicular to the optical axis.

Figure 17:
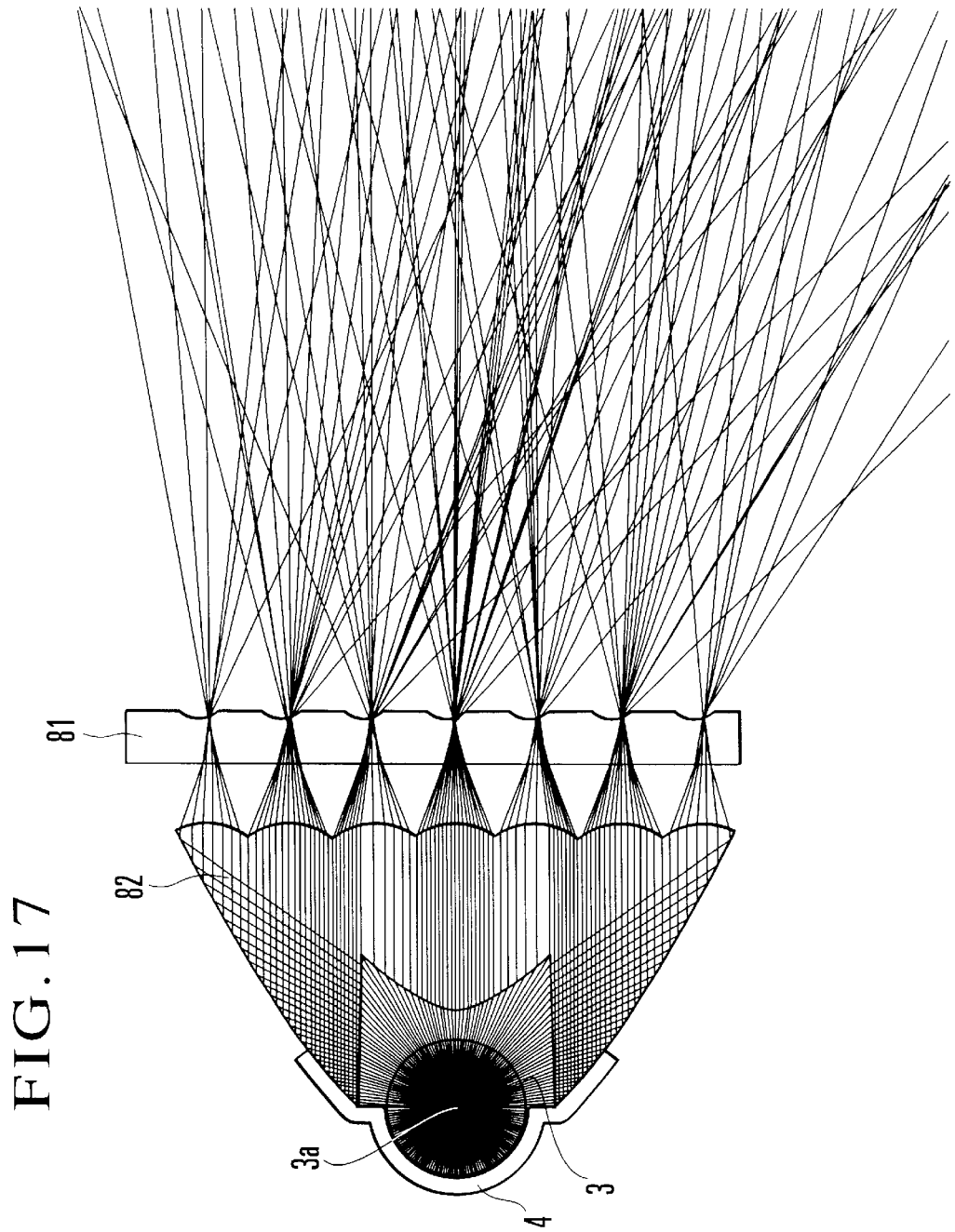
FIG. 17 is a vertical sectional view taken in the direction of diameter of the flash discharge tube of the flash device according to the seventh embodiment showing a distribution of rays of light in a still another light-diffusing state.

FIG. 17 shows by way of example a combination of the movement shown in FIG. 15 and the movement shown in FIG. 16. In this case, the optical prism 82 and the optical panel 81 are arranged to be movable relative to each other also in the perpendicular direction while moving them relative to each other in parallel to the direction of the optical axis.

In the case of FIG. 17, the optical panel 81 is moved upward to a predetermined extent relative to the optical prism 82 from its position shown in FIG. 15. As shown in FIG. 17, the exiting directions of light fluxes emitted from the light source can be tilted by decentering the relative positions of the optical elements.

In this case, a light-emitting unit including the optical prism 82 is moved 0.2 mm downward with respect to the optical panel 81. By this, the overall luminous intensity distribution characteristic can be tilted downward to a predetermined degree.

The above-stated arrangement for combining the parallel and vertical moving directions of the relative positions of the optical elements not only permits control over the illumination range size varying action but also permits a certain amount of control over the direction of illumination.

In the case of the seventh embodiment, the cylindrical surfaces 81a having the negative refractive power are formed on the illumination surface side of the optical panel 81. However, the configuration of the optical panel 81 is not limited to this configuration. For example, the optical panel 81 may be arranged to have the negative refractive surfaces symmetrically allocated not only on the illumination surface side but also on both sides of the optical panel 81. The same advantageous effect of the seventh embodiment can be obtained by modifying the seventh embodiment in this manner.

Next, an eighth embodiment of the invention is described with reference to FIGS. 18 and 19. The eighth embodiment is characterized in that each cylindrical lens formed on the optical prism as set forth in the first embodiment is made to have a negative refractive power. Further, on a surface of the optical panel opposite to the optical prism, there is formed a cylindrical surface made to have such a positive refractive power as to cancel the negative refractive power of the optical prism, and the cylindrical surface of the optical prism and the cylindrical surface of the optical panel are respectively formed to such shapes as to fit in with each other. Such an arrangement of the eighth embodiment is described below referring to FIGS. 18 and 19.

Figure 18:
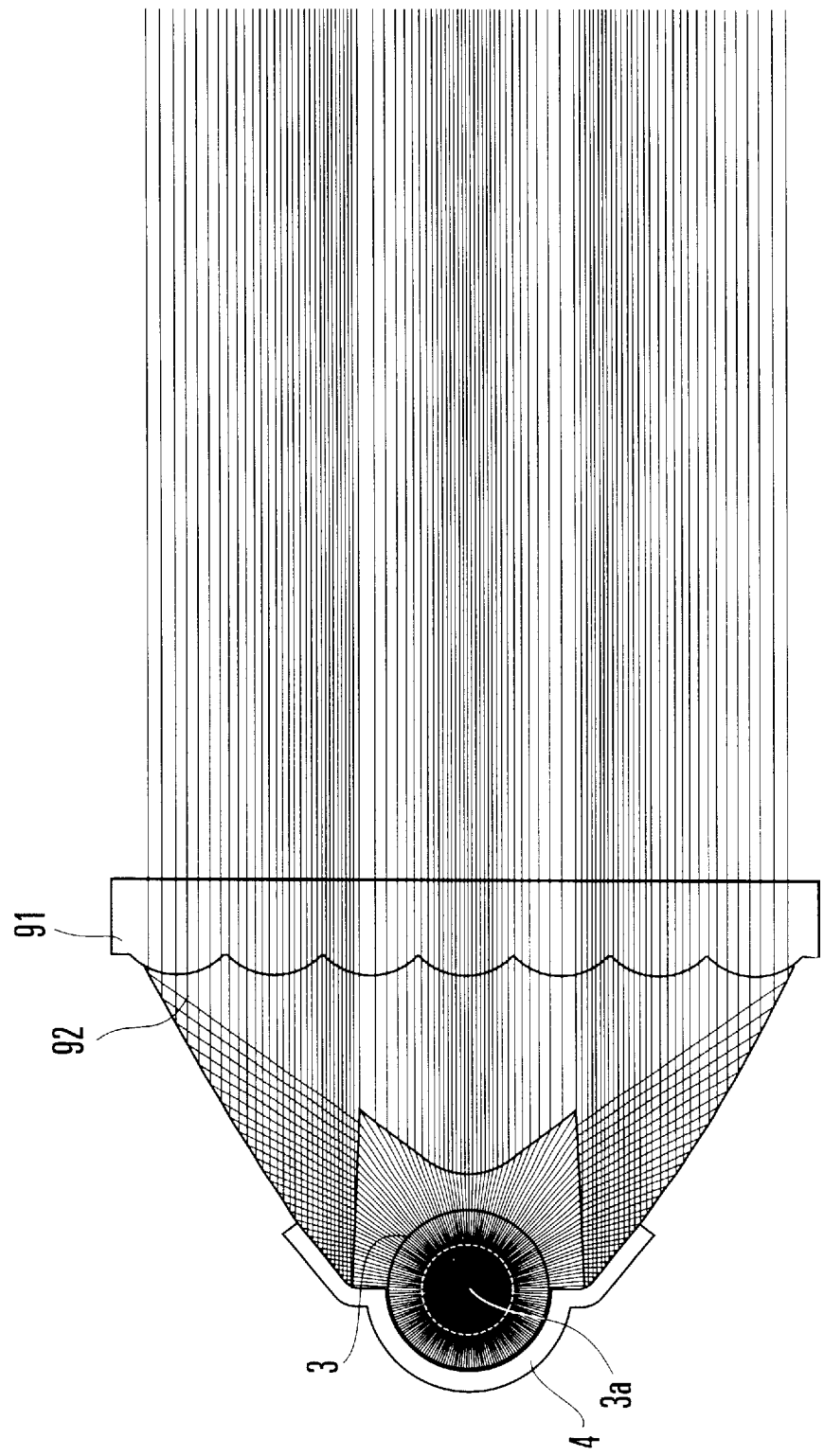
FIG. 18 is a vertical sectional view taken in the direction of diameter of a flash discharge tube of a flash device according to an eighth embodiment of the invention showing a distribution of rays of light in a light-collecting state.
Figure 19:
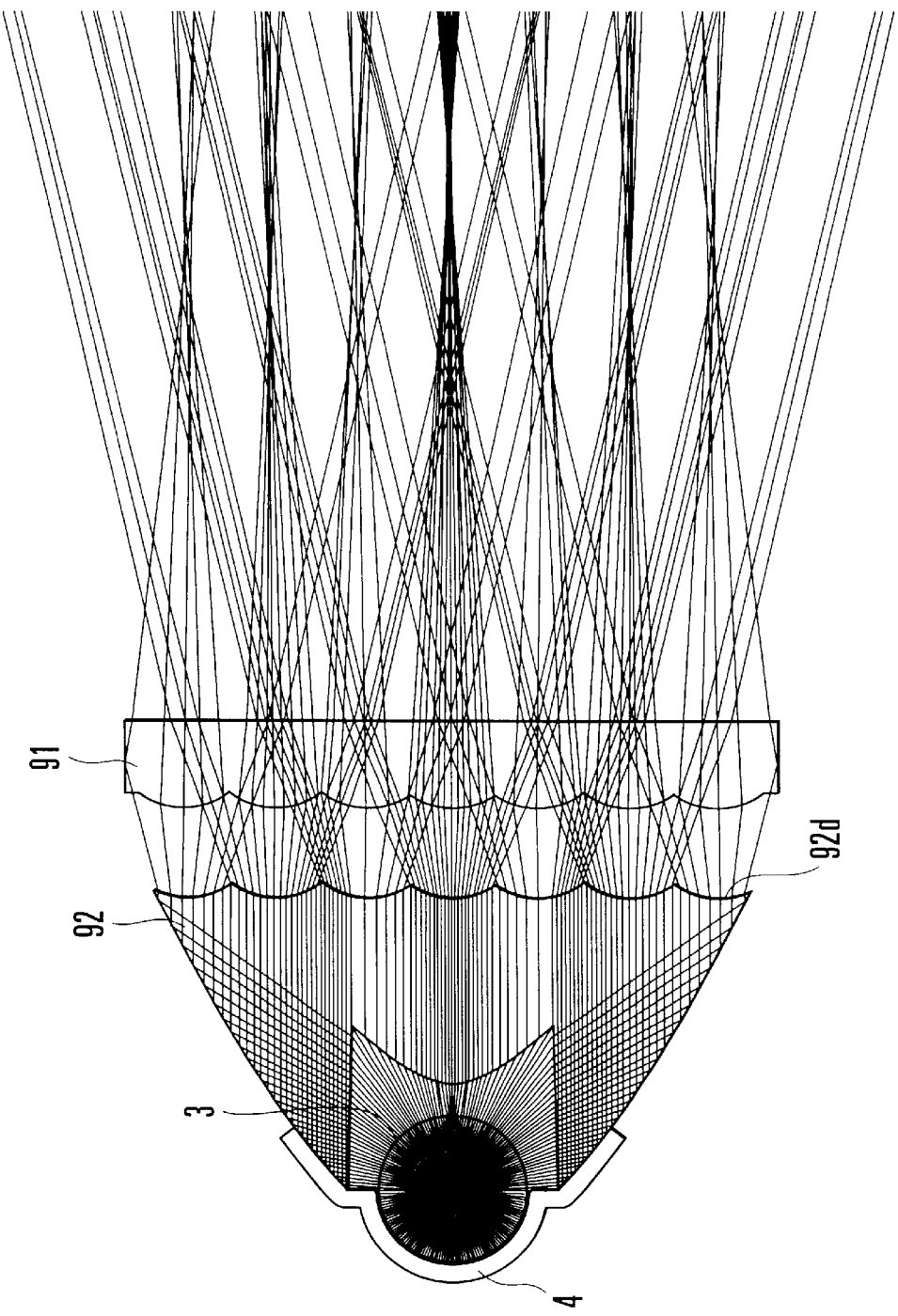
FIG. 19 is a vertical sectional view taken in the direction of diameter of the flash discharge tube of the flash device according to the eighth embodiment showing a distribution of rays of light as in a light-diffusing state.

As shown in FIG. 18, even if concave and convex surfaces (negative and positive refractive powers) are replaced with each other between the optical prism 92 and the optical panel 91, there is little change in the distribution characteristic of a light-collecting state, so that the light-collecting state is maintained. Further, referring to FIG. 19, which shows a light-diffusing state obtained by making the optical prism 92 and the optical panel 91 at a distance from each other, it is also apparent that the degree of diffusion varies at a fixed rate. Accordingly, such an arrangement also makes it possible to vary the angle of illumination.

In addition, while, in each of the above-described embodiments, the exit surface of the optical prism and the opposite surface of the optical panel are formed to such shapes as to completely fit in with each other or to such shapes as to make refractive powers of both surfaces completely cancel each other, it is not always necessary to make both shapes completely fit in with each other. For example, such an improvement may be applied that the shape of a part of the opposite surface of the optical panel is made different from the shape of a corresponding part of the exit surface of the optical prism to provide a diffusion property at those so that the required characteristic of light distribution as a whole can be realized. Alternatively, the entire shapes of both surfaces may be intentionally made different from each other so that the refractive powers of both surfaces cancel each other at a point in an intermediate stage, where light is most collected.

Further, while, in each of the above-described embodiments, the relative movement of the optical prism and the optical prism is made in the optical axis direction, the direction of that movement is not limited to such a direction parallel with the optical axis. For example, as described in the seventh embodiment, the relative movement of the optical prism and the optical prism may be made in the vertical direction, or may be made in the vertical direction along with the relative movement thereof parallel with the optical axis direction. Such an arrangement also makes it possible to vary the characteristic of light distribution in the same manner as those in the above-described embodiments.

As has been described above, according to each of the above-described embodiments, the size of a light-collecting optical system serving as a base of a variable-illumination-angle illumination optical system is reduced as much as possible, and the amount of movement required for the variation of illumination angle is also reduced as compared with the conventional illumination optical system. Accordingly, it is possible to attain an illumination device having the entire illumination optical system extremely small-sized and having such a size as to enable the illumination device to be mounted on the various optical apparatuses, and a photographing apparatus using the illumination device.

In addition, it is possible to provide a variable-illumination-angle illumination device which is excellent in optical characteristic, for example, which is capable of continuously varying the characteristic of light distribution, and is capable of obtaining a uniform light distribution at every zoom point.

Further, since a variable-illumination-angle illumination optical system according to each of the above-described embodiments is given the high freedom of design, it is possible to design, with ease, an illumination-angle varying mechanism which is optimum in accordance with the size, the mechanical accuracy, the optical characteristic, etc., required as a product.

Furthermore, it is possible to produce an illumination-angle varying mechanism at low cost because of only a few constituent elements thereof, and the illumination-angle varying mechanism is widely usable with the various illumination optical systems. Accordingly, an extremely high general-purpose technical art can be established.

On the other hand, since the light collection within the optical prism is performed by utilizing total reflection, the efficiency of utilization of energy with regard to one and the same light source is high. Accordingly, even if a variable-illumination-angle illumination optical system is reduced in size, the optical characteristic thereof is not lowered, or rather, effective energy for illuminating an angle of view can be increased.

What is claimed is:

1. An illumination device comprising:
   a light source;
   a first optical member having a total-reflection surface for totally reflecting at least a part of incident light, light emitted from said light source being made incident on said first optical member; and
   a second optical member, light having exited from said first optical member being made incident on said second optical member,
   wherein said illumination device varies a state of illumination light by varying a positional relationship between said first optical member and said second optical member.

2. An illumination device according to claim 1, wherein said first optical member further has a first entrance surface, a second entrance surface and an exit surface, and light incident on said first entrance surface advances directly to said exit surface and light incident on said second entrance surface advances to said exit surface through said total-reflection surface.

3. An illumination device according to claim 2, wherein said second entrance surface is a plane surface, and the following condition is satisfied:

$$0° \leq \phi < 2°$$

where $\phi$ is an inclination of said second entrance surface with respect to an exit optical axis of said illumination device.

4. An illumination device according to claim 1, wherein light emitted from the center of said light source and advancing to an exit surface of said first optical member is a parallel beam.

5. An illumination device according to claim 1, wherein an exit surface of said first optical member is provided with a pattern having a predetermined refracting action, and said second optical member is provided with a pattern for substantially offsetting the refracting action of the exit surface of said first optical member at a predetermined position.

6. An illumination device according to claim 5, wherein said light source has a cylindrical shape extending in a predetermined direction, and the exit surface of said first optical member has a refracting action in a direction perpendicular to the predetermined direction.

7. An illumination device according to claim 6, wherein the exit surface of said first optical member is provided with a pattern in which a plurality of cylindrical lenses each having a refracting action within a plane perpendicular to the predetermined direction are arranged in a direction perpendicular to the predetermined direction, and wherein each of said plurality of cylindrical lenses has such a shape as to convert a parallel light beam into a plurality of convergent rays.

8. An illumination device according to claim 7, wherein the following conditions are satisfied:

$$0.5 \text{ mm} \leq L \leq 4.0 \text{ mm}$$

$$P/2 \leq D \leq 2 \times P$$

where L is a maximum distance between said first optical member and said second optical member, P is a pitch of said plurality of cylindrical lenses, and D is a paraxial focal length of each of said plurality of cylindrical lenses.

9. An illumination device according to claim 6, wherein the exit surface of said first optical member is provided with a pattern in which a plurality of cylindrical lenses each having a refracting action within a plane perpendicular to the predetermined direction are arranged in a direction perpendicular to the predetermined direction, and wherein each of said plurality of cylindrical lenses has such a shape as to proportionally distribute a parallel light beam at a predetermined rate according to an incidence position thereof.

10. An illumination device according to claim 5, wherein the exit surface of said first optical member has a refracting action varying according to a position thereof.

11. An illumination device according to claim 1, wherein an exit surface of said first optical member is provided with a pattern having a predetermined refracting action, and said second optical member is provided with a pattern having such a shape as to substantially fit in with the exit surface of said first optical member.

12. An illumination device according to claim 11, wherein said light source has a cylindrical shape extending in a predetermined direction, and the exit surface of said first optical member has a refracting action in a direction perpendicular to the predetermined direction.

13. An illumination device according to claim 12, wherein the exit surface of said first optical member is provided with a pattern in which a plurality of cylindrical lenses each having a refracting action within a plane perpendicular to the predetermined direction are arranged in a direction perpendicular to the predetermined direction, and wherein each of said plurality of cylindrical lenses has such a shape as to convert a parallel light beam into a plurality of convergent rays.

14. An illumination device according to claim 13, wherein the following conditions are satisfied:

$$0.5 \text{ mm} \leq L \leq 4.0 \text{ mm}$$

$$P/2 \leq D \leq 2 \times P$$

where L is a maximum distance between said first optical member and said second optical member, P is a pitch of said plurality of cylindrical lenses, and D is a paraxial focal length of each of said plurality of cylindrical lenses.

15. An illumination device according to claim 12, wherein the exit surface of said first optical member is provided with a pattern in which a plurality of cylindrical lenses each having a refracting action within a plane perpendicular to the predetermined direction are arranged in a direction perpendicular to the predetermined direction, and wherein each of said plurality of cylindrical lenses has such a shape as to proportionally distribute a parallel light beam at a predetermined rate according to an incidence position thereof.

16. An illumination device according to claim 11, wherein the exit surface of said first optical member has a refracting action varying according to a position thereof.

17. An illumination device according to claim 1, wherein said second optical member is provided, on at least a part of en exit surface thereof, with a Fresnel lens.

18. An illumination device according to claim 1, further comprising:

a reflection member disposed on a side of said light source opposite to said first optical member, said reflection member having a reflecting surface in the shape of a circle in a predetermined section having a central point thereof set at the center of said light source.

19. A photographing apparatus comprising:

a photographic optical system; and an illumination device according to claim 1, wherein said photographing apparatus varies a state of illumination light emitted from said illumination device, according to a state of said photographic optical system.

* * * * *

UNITED STATES PATENT AND TRADEMARK OFFICE
CERTIFICATE OF CORRECTION

PATENT NO. : 6,807,369 B1
DATED : October 19, 2004
INVENTOR(S) : Yoshiharu Tenmyo It is certified that error appears in the above-identified patent and that said Letters Patent is hereby corrected as shown below:

Column 1,
Line 54, "recently" should read -- recently been --.

Column 2,
Line 12, "sideway" should read -- sideways --.

Column 9,
Line 9, "is" should read -- are --.

Column 13,
Line 25, "of" (second occurrence) should read -- of the --.

Column 14,
Line 2, "FIG." should read -- FIGS. --.

Column 15,
Line 42, "cylindrical the" should read -- cylindrical --.

Column 17,
Line 63, "of" should read -- of the --.

Column 22,
Line 21, "sideway" should read -- sideways --.

Column 25,
Line 42, "prism is" should read -- panel is --.
Line 46, "prism may" should read -- panel may --.

UNITED STATES PATENT AND TRADEMARK OFFICE
CERTIFICATE OF CORRECTION

PATENT NO. : 6,807,369 B1
DATED : October 19, 2004
INVENTOR(S) : Yoshiharu Tenmyo It is certified that error appears in the above-identified patent and that said Letters Patent is hereby corrected as shown below:

Column 28,
Line 30, "en" should read -- an --.

Signed and Sealed this

Third Day of May, 2005

JON W. DUDAS
*Director of the United States Patent and Trademark Office*